United States Patent
Conti et al.

(10) Patent No.: US 11,549,614 B2
(45) Date of Patent: Jan. 10, 2023

(54) METHOD AND SYSTEM FOR LAYING A SUBMARINE PIPELINE

(71) Applicant: SAIPEM S.P.A., Milan (IT)

(72) Inventors: Flavio Conti, Milan (IT); Diego Forestali, Milan (IT)

(73) Assignee: SAIPEM S.P.A., Milan (IT)

( * ) Notice: Subject to any disclaimer, the term of this patent is extended or adjusted under 35 U.S.C. 154(b) by 332 days.

(21) Appl. No.: 16/614,590

(22) PCT Filed: May 25, 2018

(86) PCT No.: PCT/IB2018/053734
§ 371 (c)(1),
(2) Date: Nov. 18, 2019

(87) PCT Pub. No.: WO2018/215981
PCT Pub. Date: Nov. 29, 2018

(65) Prior Publication Data
US 2020/0109797 A1    Apr. 9, 2020

(30) Foreign Application Priority Data

May 26, 2017  (IT) .......................... 102017000057253

(51) Int. Cl.
*F16L 1/235*    (2006.01)
*F16L 1/19*    (2006.01)
(Continued)

(52) U.S. Cl.
CPC ................ *F16L 1/19* (2013.01); *B63B 35/03* (2013.01); *B23K 2101/10* (2018.08);
(Continued)

(58) Field of Classification Search
CPC ... F16L 1/16; F16L 1/165; F16L 1/126; F16L 1/235; F16L 1/19
See application file for complete search history.

(56) References Cited

U.S. PATENT DOCUMENTS 3,690,112 A    9/1972  Pattison
4,133,182 A    1/1979  Chateau
(Continued)

FOREIGN PATENT DOCUMENTS

FR    2957649 A1 *  9/2011

OTHER PUBLICATIONS

Machine Translation of FR 2957649, 19 pages (Year: 2011).*
(Continued)

*Primary Examiner* — Sunil Singh
(74) *Attorney, Agent, or Firm* — Cantor Colburn LLP

(57) ABSTRACT

A method of laying an off-shore pipeline (1) comprises: —installing on the seabed (3) a fixed receiving structure (4) having a redirecting device (5), —paying-out from a laying vessel (7) a pipeline (1) with the pipeline end termination device (9) vertically towards the seabed (3), —extending a damping cable (6) from the pipeline end termination device (9) through the redirecting device (5) to an underwater damping buoy (14), —connecting an underwater suspension buoy (15) to the pipeline end termination device (9), —inclining the pipeline (1) from a vertical orientation towards the horizontal orientation, using: —the suspension buoy (14) to counterbalance at least part of the weight of the pipeline end termination device (9), —the damping buoy (14) for damping the pipeline (1).

32 Claims, 14 Drawing Sheets

(51) Int. Cl.
*B63B 35/03* (2006.01)
*B23K 101/10* (2006.01)
*E21B 43/01* (2006.01)
*F16L 1/26* (2006.01)

(52) U.S. Cl.
CPC ........... *E21B 43/0107* (2013.01); *F16L 1/235* (2013.01); *F16L 1/26* (2013.01)

(56) References Cited

U.S. PATENT DOCUMENTS

| 7,654,773 B2 | 2/2010 | Bastard |
| 2011/0020067 A1 | 1/2011 | Espinasse |

OTHER PUBLICATIONS

International Search Report for corresponding application PCT/IB2018/053734 filed May 25, 2018; dated Jan. 16, 2019.
Written Opinion for corresponding application PCT/IB2018/053734 filed May 25, 2018; dated Jan. 16, 2019.

\* cited by examiner

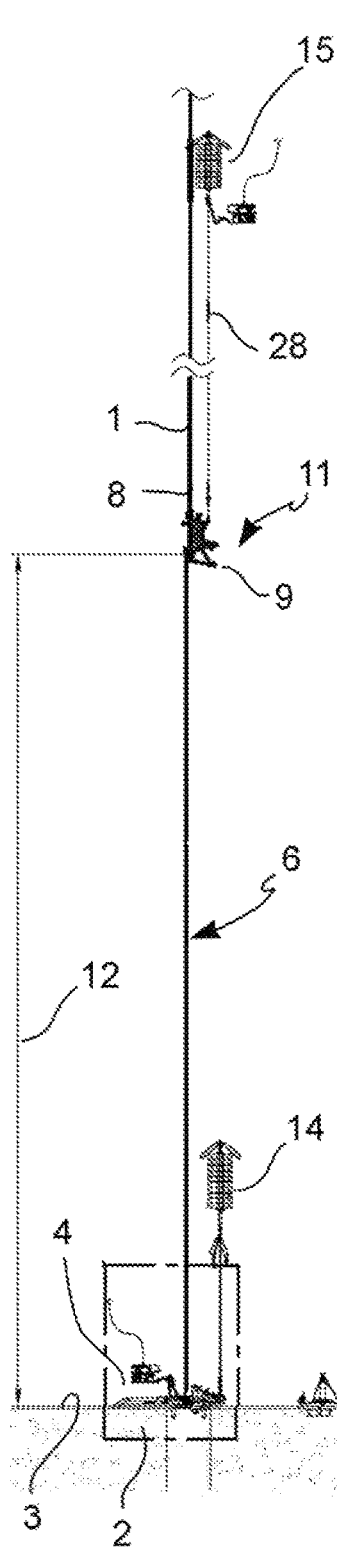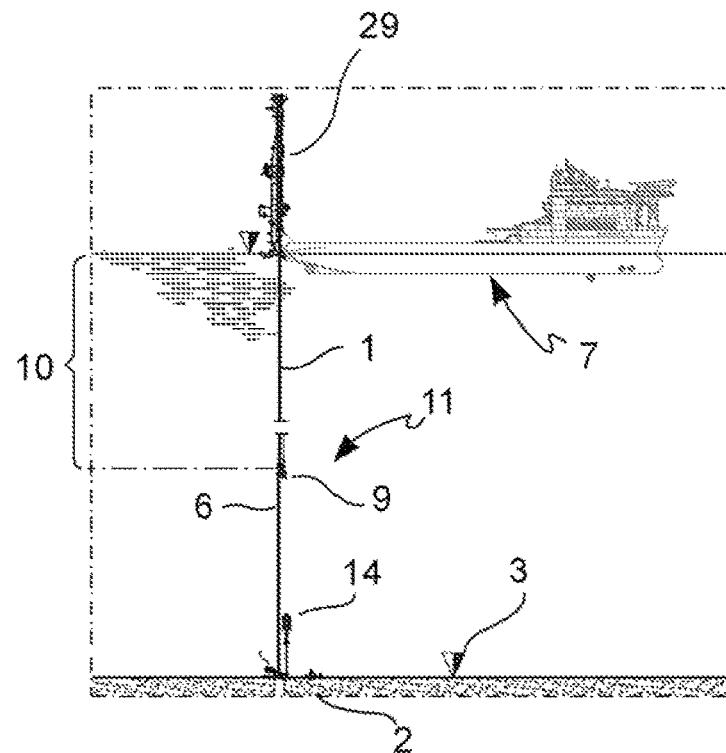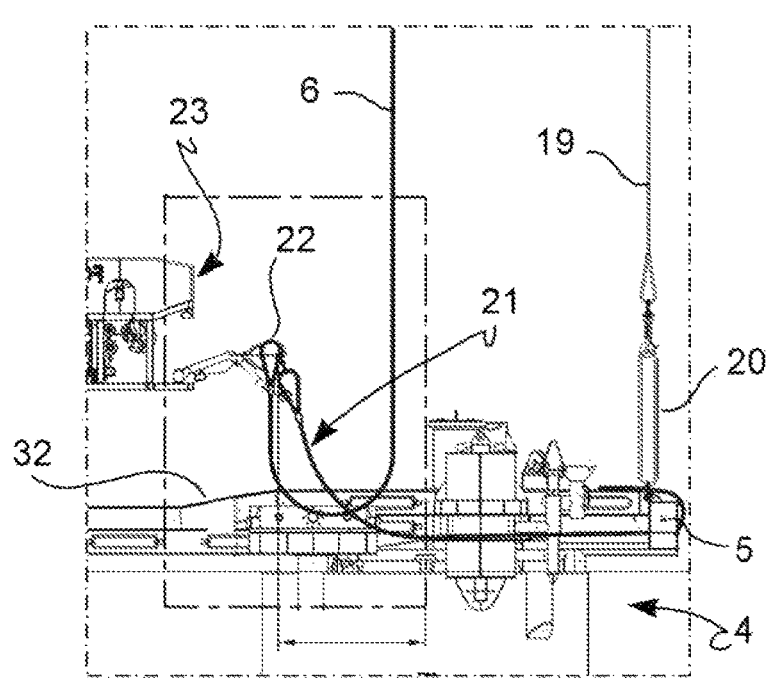
FIG. 2A
FIG. 2B
FIG. 2C

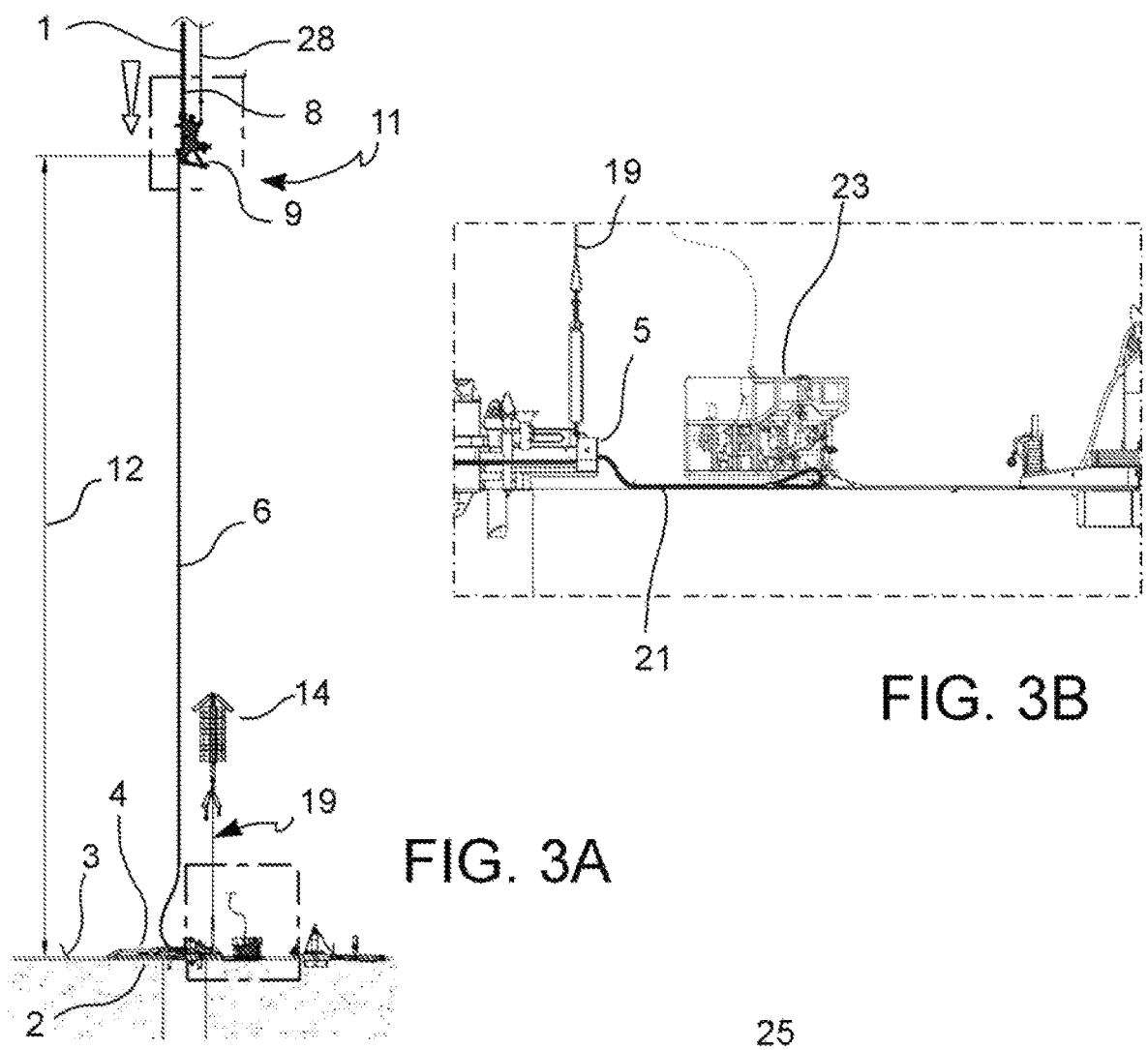
FIG. 3A
FIG. 3B
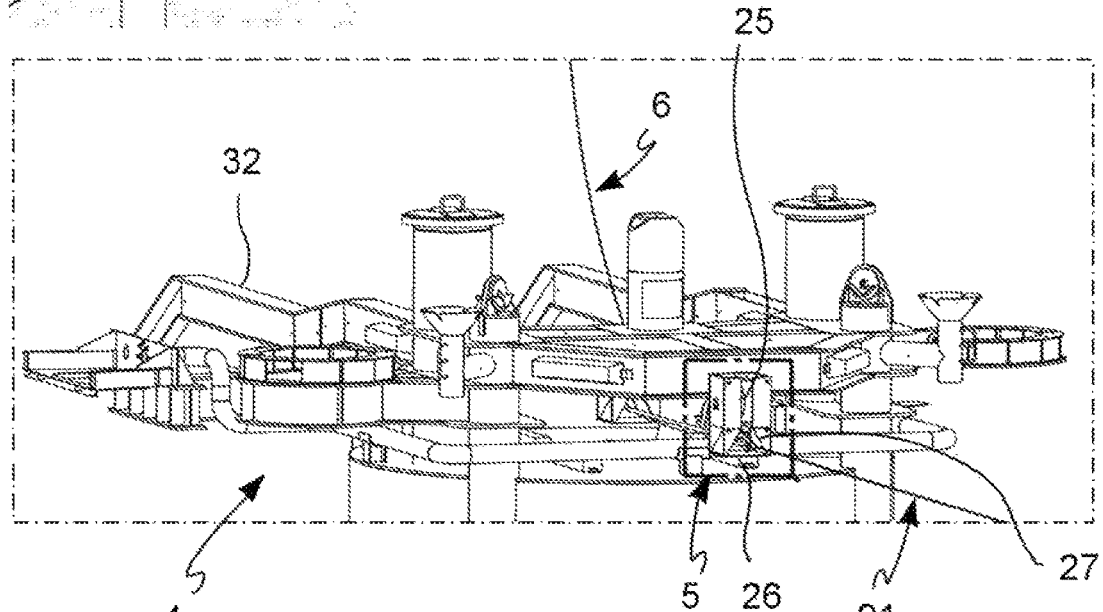
FIG. 3C

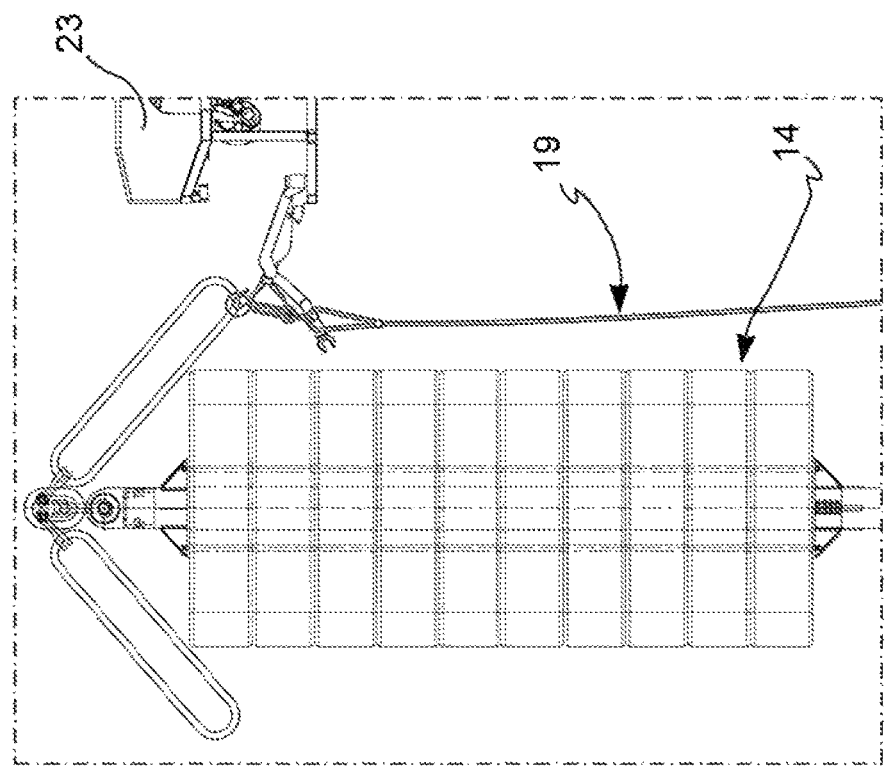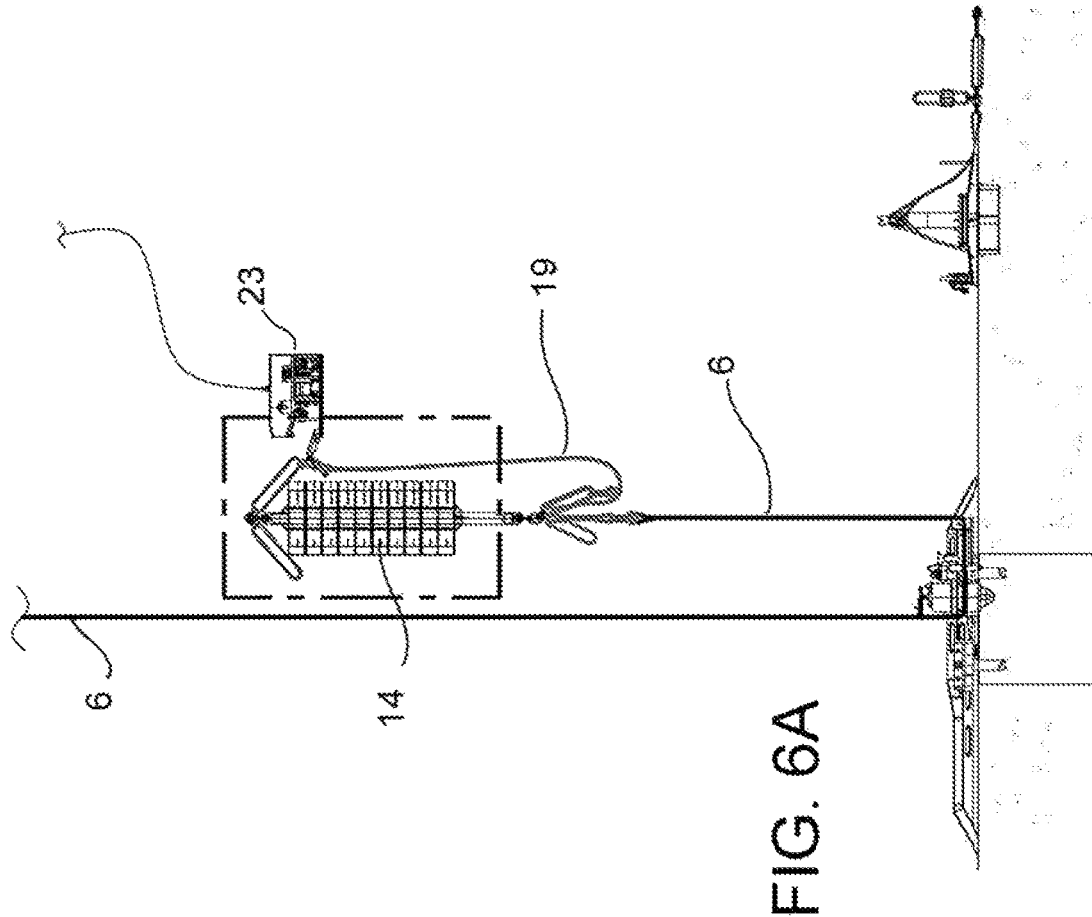

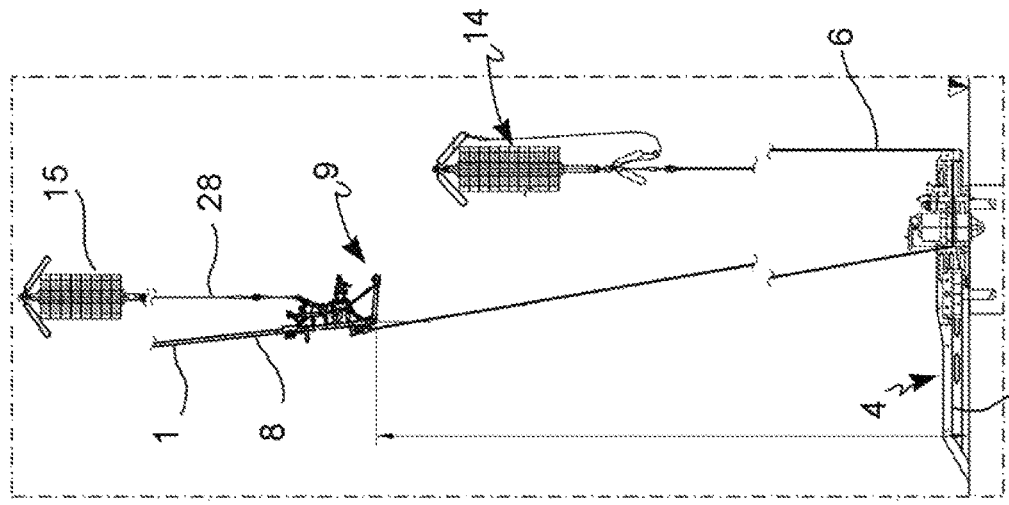
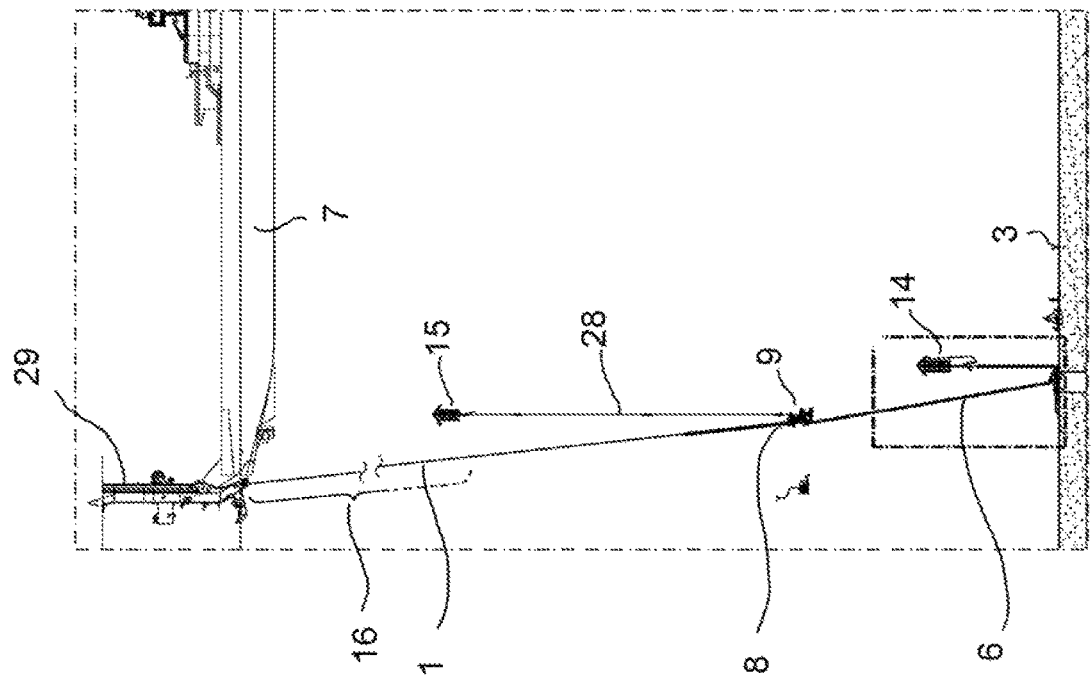

METHOD AND SYSTEM FOR LAYING A SUBMARINE PIPELINE

The invention relates to a method and a system for laying a submarine pipeline, in particular for a step of initiating the laying of the pipeline.

FIELD OF THE ART

In a typical petroleum or natural gas off-shore pipeline laying scenario in deep and ultra-deep waters from hundreds to thousands of meters deep, e.g. 300 m-4000 m, both in the case of pipelines with continuous horizontal extension and in the case of pipelines with catenary extension or extending from the bottom upwards (risers), in an initial step a pipeline string is payed-out from a laying vessel, e.g. by means of a "J" laying tower which pays-out a pipeline string, provided aboard the laying vessel downwards, either vertically or nearly vertically. A pipeline end termination device (PLET), intended to be installed on the seabed and configured for connecting the pipeline to an application, e.g. a well head or a flow collector, is mounted at the free end of the pipeline string.

One of the critical steps of off-shore piping laying is the approaching and anchoring of the pipeline end termination device to a target position, e.g. to a receiving structure, on the seabed. The motion of the laying vessel, due to waves, wind and currents, together with the movements of the pipeline caused by marine currents, cause dynamic movements of the suspended pipeline and residual dynamic movements of the pipeline end termination device near the seabed. These movements can result in damage to the pipeline and/or damage to the pipeline end termination device during all steps of paying-out, and are particularly critical in the steps of approaching, landing and coupling. So, the initial step of offshore pipeline laying requires certain weather conditions and/or additional measures to damp the movements of pipeline and to reduce landing impacts.

PRIOR ART

In a solution previously tested by the Applicant, before starting laying the pipeline, a very heavy, temporary dead man anchor is installed on the seabed at a distance of about 60-100 m from the target position in which the pipeline end termination device must land. A system with steel cables connected to one another and with two buoys is coupled to a fixed point on the dead man anchor. Subsequently, the pipeline string is payed-out by a laying vessel by means of "J" laying downwards either vertically or nearly vertically, approximately over the position of the anchor. Subsequently, a first buoy is connected to the pipeline end termination device (PLET), the task of which is to support a significant part of the weight of the pipeline termination end attached to the rest of the pipeline. A system consisting of two consecutive cables—in the interconnection point of which a second buoy is further connected —is then connected to the end of the pipeline, whereby providing a temporary connection between the pipeline end and the dead man anchor. A damping effect is achieved using the multi-catenary configuration of the two cables, in the interconnection of which the second buoy acts, by keeping the system under tension by a movement of the laying vessel.

The disadvantage of this system consists in the uncertainty of the final positioning of the pipeline end termination device with respect to the target position. A further disadvantage consists in the need for a completely free space of about 60-100 m between the anchor and the target position of the pipeline end termination device. This condition may be not feasible due to the presence of well heads and of other structures and systems previously installed on the seabed or not desirable during the step of designing of the layout of the submarine field.

A further solution for initiating a pipeline, described in U.S. Pat. No. 7,654,773, uses a first laying vessel, a second service vessel equipped with controlled pull winches and a structure with pulley installed on the seabed and a steel cable extending between the pipeline end termination device and the winch of the ship winch and redirected through the redirection pulley installed on the seabed.

The solution described in U.S. Pat. No. 7,654,773 requires two vessels on the surface and a precise and delicate coordination of the positions and of the movements of the two vessels, and of the pipeline feeding speed and of the winch actuation speed. Furthermore, both vessels on the surface are exposed to the wind and the wave motion and may transmit their combined movements to the pipeline end termination device, whereby increasing the dependence on favorable weather conditions, making it necessary to use winches with accessory controls and functions, such as active or constant tension compensation systems.

If a permanent anchoring of the submarine pipeline is required, as in the case of so-called steel catenary risers (SCR) or steel lazy wave risers (SLWR), it is known to connect the pipeline end termination device to an anchoring foundation by means of a permanent chain upstream of the pipeline end termination device, or alternatively by means of two permanent chains arranged straddling a special coupling on the pipeline and two anchoring foundations previously installed or to be installed on the seabed. The solution with anchoring by means of chains implies significant costs for procuring and installing the permanent chains. In some cases, this solution could also imply time and sequence constraints between completion of the pipeline, the removal of the initiating system and the installation of the chains.

Therefore, it is the object of the invention to provide a method and a system for laying offshore pipelines, in particular for a step of initiating the pipeline laying, having such features as to overcome at least some of the drawbacks of the prior art.

A particular object of the invention is to avoid the risk of damage to the pipeline and to the pipeline end termination device and to be able to perform the step of initiating the offshore pipeline allowing to work also in less favorable weather conditions.

It is a further particular object of the invention to avoid the need for a second vessel for initiating the off-shore pipeline.

It is a further particular object of the invention to avoid the need for a large space free from other installations on the seabed. It is a further particular object of the invention to achieve a high positioning precision of the pipeline end termination device with respect to its target position.

It is a further particular object of the invention to provide a method for directly and immediately anchoring the pipeline end termination which does not require the use of a permanent chain to be installed successively by an auxiliary vessel.

GENERAL DESCRIPTION OF THE INVENTION

At least some of these objects are achieved by an off-shore pipeline laying method according to claim 1 and by means of an off-shore pipeline laying system according to claim 12.

The dependent claims relate to advantageous embodiments which solve further and more specific technical issues.

According to an aspect of the invention, a method of laying an off-shore pipeline comprises:

installing a fixed receiving structure having a redirecting device for a damping cable in a target position on the seabed, on a laying vessel (floating on the surface), providing the pipeline with an initial end length onto which a pipeline end termination device is mounted, connecting an underwater suspension buoy to the pipeline end termination device, the suspension buoy applying a suspension force which is directed vertically upwards to the pipeline end termination device, paying-out a first length of the pipeline with the pipeline end termination device from the laying vessel vertically towards the seabed to a provisional anchoring position, in which the initial end length has an approximately vertical orientation with a vertical safety distance between the pipeline end termination device and the seabed, extending a damping cable from the pipeline end termination device through the redirecting device to an underwater damping buoy (or vice versa), the extension of the damping cable being less than the depth of the water, so that the damping cable, slidingly supported and redirected by the redirecting device and tensioned by a buoyancy force of the damping buoy, forms a damping provisional anchoring of the pipeline end termination device to the fixed receiving structure, moving the laying vessel horizontally away from the fixed receiving structure and paying-out, from the laying vessel, a further length of the pipeline so as to incline the initial end length progressively from the vertical orientation towards a horizontal orientation up to a lowered position (which does have to be necessarily perfectly horizontal but may have a slight inclination), with the initial end length in the lowered position, moving the laying vessel to position the initial end length in horizontal direction (or with at least one horizontal component) in a final abutment position with respect to said target position, then abutting the pipeline end termination device in the final abutment position, during the steps of inclining to the lowered position and of horizontally positioning the initial end length:

using the suspension force of the suspension buoy to counterbalance at least part of the weight of the pipeline end termination device, using the buoyancy force of the damping buoy to counterbalance a pulling force of the initial end length of the pipeline and to damp the movements of the initial end length of the pipeline, using the sliding support of the redirected damping cable to allow relative compensation movements between the pipeline end termination device and the fixed receiving structure.

According to a further aspect of the invention, a system is provided for laying an off-shore pipeline by means of a method, wherein:

the pipeline is provided on a laying vessel and a first length of the pipeline is payed-out from the laying vessel vertically towards the seabed until reaching a provisional anchoring position, wherein an initial end length of the pipeline has an approximately vertical orientation and a vertical safety distance between the initial end length of the pipeline and the seabed, then the laying vessel moves horizontally and pays-out a further length of the pipeline so as to allow a gradual inclination of the initial end length from the vertical orientation towards a horizontal orientation until reaching a lowered position (which does have to be necessarily perfectly horizontal but may have a slight inclination), with the initial end length in the lowered position, moving the laying vessel to position the initial end length in horizontal direction (or with at least one horizontal component) in a final abutment position with respect to a target position, then abutting the initial end length in the final abutment position, wherein the laying system comprises:

a fixed receiving structure which can be installed in the target position on the seabed, said fixed receiving structure having a redirecting device for a damping cable, a pipeline end termination device which can be mounted to the initial end length of the pipeline, an underwater suspension buoy which is removably connectable to the pipeline end termination device so as to apply a vertically upwards directed suspension force to the pipeline end termination device, an underwater damping buoy having a buoyancy force, a damping cable removably connectable to the damping buoy and to the pipeline end termination device and extending through the redirecting device, so that the damping cable is slidingly supported and redirected by the redirecting device and tensioned by the buoyancy force of the damping buoy, so as to form a damping provisional anchoring of the pipeline end termination device to the fixed receiving structure, wherein during the steps of inclining to the lowered position and of horizontally positioning the initial end length:

the suspension force of the suspension buoy counterbalances at least part of the weight of the pipeline end termination device, the buoyancy force of the damping buoy counterbalances a pulling force of the initial end length of the pipeline, the sliding support of the redirected damping cable allows relative compensation movements between the pipeline end termination device and the fixed receiving structure.

By virtue of the damping buoyancy force, redirected and applied by means of a slidably supported cable, and of the buoyant suspension force applied directly to the initial end of the pipeline, a damping is achieved of the movements of the initial end of the pipeline, together with a suspension from above against undesired impacts of the initial end of the pipeline on the seabed or on the fixed receiving structure, as well as a continuous tensioning of the initial end of the pipeline in the desired direction, i.e. towards the target position on the seabed, in particular on a receiving structure.

This reduces the effect of the undesired movements (induced by the wind and waves) of the laying vessel on the initial end of the pipeline, reduces the accelerations of the initial end of the pipeline during the abutment step on the fixed receiving structure or on the seabed in the final abutting position, increases the positioning precision of the pipeline end termination device with respect to the fixed receiving structure and with respect to other underwater structures to be connected thereto.

By virtue of the initial vertical lowering of the pipeline over the fixed receiving structure and subsequent inclination of the initial end length of the pipeline from the target position of the fixed receiving structure, the laying of the pipeline may begin even in the presence of other underwater structures pre-installed near the target position and does not require entirely empty spaces around the starting point of the pipeline.

In this way, the laying of the pipeline can begin without introducing constraints in the installation sequence if other underwater structures are installed near the target position (the pipeline starting position). Furthermore, in the step of designing a submarine field, the method and the system eliminate the constraint of an empty horizontal corridor near the target position and make the positioning of the underwater structures freer, to the advantage of a more compact development of the submarine field.

The damping system and method by means of buoys displays a more rapid damping response and does not require any movement coordination between two vessels on the surface.

The system and method according to the invention does not require the installation and subsequent removal of a temporary anchor, in addition to the foundation of the fixed receiving structure.

The laying method and system can be used in versatile manner with a wide range of pipelines and risers for deep and ultra-deep waters and in a wide range of weather conditions and marine currents. The laying method and system does not require a further service vessel, in addition to the laying vessel.

Furthermore, contrary to U.S. Pat. No. 7,654,773, after having suspended the pipeline in catenary configuration, the method and system of the present invention allow to perform operations in a continuous manner.

The method and system according to the invention allow a lighter sizing of the components of the system, because they are subject to smaller dynamic stresses. Furthermore, if the pipeline end termination device is abutted and coupled directly to the fixed receiving structure, the pipeline end termination device itself may be made as a light structure and requires neither permanent anchoring chains nor a mud mat, i.e. an extended anti-sinking structure which distributes the loads to prevent embedding in the mud of the seabed.

The method and the system according to the invention can be used to make the initial part of offshore piping extended on the seabed or steel catenary risers (SCR) or steel lazy wave risers (SLWR), the initial end stretch of which has an at least approximately horizontal orientation.

The method and the system according to the invention can be used for the in-line anchoring of the pipeline end of offshore pipelines extended on the seabed or steel catenary risers (SCR) or steel lazy wave risers (SLWR), the initial end stretch of which has an at least approximately horizontal orientation.

BRIEF DESCRIPTION OF THE FIGURES

In order to better understand the invention and appreciate its advantages, some non-limiting examples of embodiments will be described below with reference to the figures, in which:

FIGS. 2A-2C illustrate the laying system and a step of lowering an initial end length portion to a provisional anchoring position, in which FIG. 2B shows a detail in FIG. 2A and FIG. 2C shows an enlarged detail in FIG. 2B, FIGS. 3A-3C illustrate the laying system and a step of connecting of a damping cable to a damping buoy, in which FIG. 3B shows an enlarged detail of FIG. 3A and FIG. 3C shows a detail of a fixed receiving structure with a redirecting device, FIGS. 4A and 4B illustrate the laying system and a further step of connecting the damping cable to the damping buoy, in which FIG. 4B shows an enlarged detail of FIG. 4A, FIGS. 5A and 5B illustrate the laying system and a step of tensioning the damping cable connected to the damping buoy, in which FIG. 5B shows an enlarged detail of FIG. 5A, FIGS. 6A and 6B illustrate the laying system and a step of releasing the retaining cable of the damping buoy of the fixed receiving structure, in which FIG. 6B shows an enlarged detail of FIG. 6A, FIGS. 7A-7E illustrate the laying system and a step of inclining of an initial end length of the pipeline from a vertical position to a horizontal position, in which

DETAILED DESCRIPTION OF EMBODIMENTS OF THE LAYING METHOD AND SYSTEM

Figure 8A:
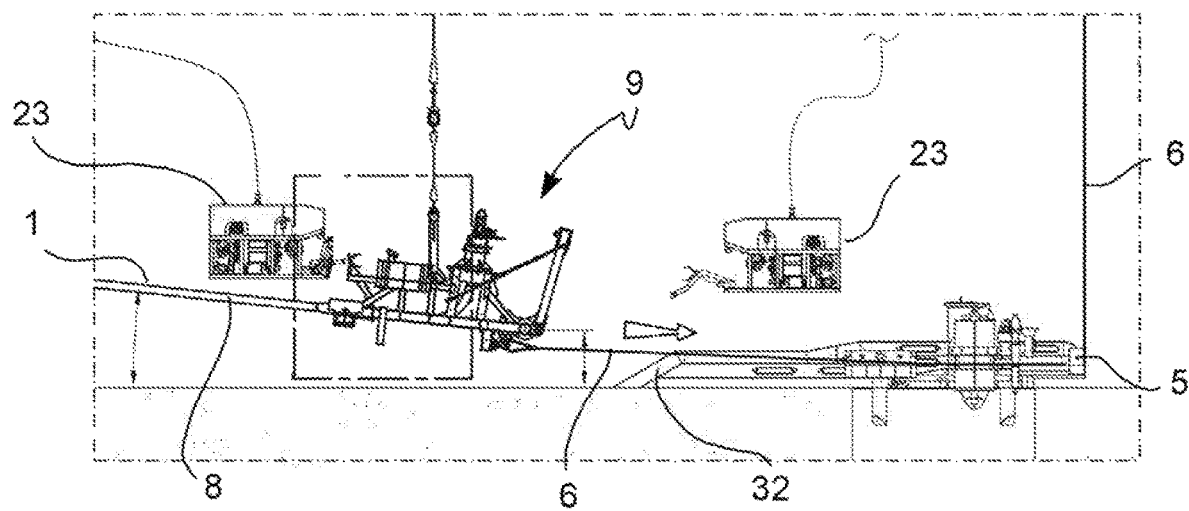

With reference to the figures, a laying method of an off-short pipeline 1 comprises:

installing a fixed receiving structure 4 having a redirecting device 5 for a damping cable 6 in a target position 2 on the seabed 3, on a laying vessel 7, providing the pipeline 1 with an initial end length 8 to which a pipeline end termination device 9 is mounted, connecting an underwater suspension buoy 15 to the pipeline end termination device 9, the underwater suspension buoy 15 applying a suspension force which is directed vertically upwards to the pipeline end termination device 9 (FIGS. 1D, 2B, 5A), paying-out a first length (i.e. a first stretch) 10 of the pipeline 1 with the pipeline end termination device 9 from the laying vessel 7 vertically towards the seabed 3 to a provisional anchoring position 11, in which the initial end length 8 has an approximately vertical orientation with a vertical safety distance 12 between the pipeline end termination device 9 and the fixed receiving structure 4 and the seabed 3 (FIGS. 1A, 2B, 2C), extending a damping cable 6 (preferably made of steel) from the pipeline end termination device 9 through the redirecting device 5 to an underwater damping buoy 14, the extension of the damping cable 6 being lower than the depth of the water (FIGS. 1B-1D, 4A, 6A), so that the damping cable 6, slidingly supported and redirected by the redirecting device 5 and tensioned by a buoyancy force of the damping buoy 14, forms a damping provisional anchoring of the pipeline end termination device 9 to the fixed receiving structure 4 (FIGS. 1D, 6A), moving the laying vessel 7 horizontally away from the fixed receiving structure 4 and paying-out, from the laying vessel 7, a further length 16 of the pipeline 1 so as to incline the initial end length 8 progressively from the vertical orientation towards a horizontal orientation up to a lowered position 17 (FIGS. 1E, 1F, 7A-7E, 8A), with the initial end length 8 in the lowered position 17, the laying vessel 7 moves to place the initial end length 8 in horizontal direction (or with at least one horizontal component) in a final abutting position 18 with respect to a target position 2 and, then, to abut the pipeline end termination device 9 in the final abutting position 18 (FIGS. 8A, 8B), e.g. by paying-out an even further length of pipeline and distancing the laying vessel 7 from the receiving structure 4 again, during the steps of inclining to the lowered position 17 and of horizontally positioning the initial end length 8:

using the suspension force of the suspension buoy 14 to counterbalance at least part of the weight of the pipeline end termination device 9, using the buoyancy force of the damping buoy 14 to counterbalance a pulling force of the initial end length 8 of the pipeline 1 and to damp the movements of the initial end length 8 of the pipeline 1, using the sliding support of the redirected damping cable 6 to allow relative compensation movements between the pipeline end termination device 9 and the fixed receiving structure 4.

According to a further aspect of the invention, a system is suggested for laying of an off-shore pipeline 1 according to a method, wherein:

the pipeline 1 is provided on a laying vessel 7 and a first length 10 of the pipeline 1 is payed-out from the laying vessel 7 vertically towards the seabed 3 until a provisional anchoring position 11 is reached, in which an initial end length 8 of the pipeline 1 has an approximately vertical orientation and a vertical safety distance 12 between the pipeline end termination device 8 and the seabed 3, then the laying vessel 7 moves horizontally and pays-out a further length 16 of the pipeline 1 so as to allow a gradual inclination of the initial end length 8 from the vertical orientation towards a horizontal orientation until reaching a lowered position 17, with the initial end length 8 in the lowered position 17, the laying vessel 7 moves to place the initial end length 8 in horizontal direction (or with at least one horizontal component) in a final abutting position 18 with respect to a target position 2 and, subsequently, the initial end length 8 is abutted in the final abutting position 18, wherein the laying system comprises:

a fixed receiving structure 4 which can be installed in the target position 2 on the seabed 3, said fixed receiving structure 4 having a redirecting device 5 for a damping cable 6, a pipeline end termination device 9 which can be mounted to the initial end length 8 of the pipeline 1, an underwater suspension buoy 15 which is removably connectable to the pipeline end termination device 9 so as to apply a vertically upwards directed suspension force to the pipeline end termination device 9, an underwater damping buoy 14 having a buoyancy force, a damping cable 6 removably connectable to the damping buoy 14 and to the pipeline end termination device 9 and extending through the redirecting device 5, so that the damping cable 6 is slidingly supported and redirected by the redirecting device 5 and tensioned by the buoyancy force of the damping buoy 14, so as to form a damping provisional anchoring of the pipeline end termination device 9 to the fixed receiving structure 14, wherein during the steps of inclining to the lowered position and of positioning the initial end length 8 of the pipeline 1 in a horizontal direction:

the suspension force of the suspension buoy 15 counterbalances at least part of the weight of the pipeline 1 and of the pipeline end termination device 9, whereby either avoiding or decreasing the impacts of the pipeline end termination device 9 on the fixed receiving structure 4 or on the seabed 3, the buoyancy force of the damping buoy 14 counterbalances a pulling force of the initial end length 8 of the pipeline 1, the sliding support of the redirected damping cable 6 allows relative compensation movements between the pipeline end termination device 9 and the fixed receiving structure 4.

By virtue of the damping buoyancy force, redirected and applied by means of a slidably supported damping cable 6, and of the buoyant suspension force applied directly to the initial end 8 of the pipeline 1, a compensation and damping is achieved of the movements of the initial end 8 of the pipeline 1, together with a suspension from above against undesired impacts of the initial end 8 of the pipeline 1 on the seabed 3 or on the fixed receiving structure 4, as well as a continuous tensioning of the initial end 8 of the pipeline 1, towards the target position 2 on the seabed 3 during the initial step of laying of the pipeline 1.

This reduces the dynamic components of the forces acting on the initial end 8 of the pipeline 1, increases the positioning precision of the pipeline end termination device 9 with respect to the fixed receiving structure 4 and with respect to other underwater structures intended to be connected to it.

By virtue of the initial vertical lowering of the pipeline 1 over the fixed receiving structure 4 and subsequent inclination of the initial end length 8 of the pipeline 1 from the target position 2 of the fixed receiving structure 4, the laying of the pipeline 1 may begin even in the presence of other underwater structures pre-installed near the target position 2 and does not require entirely empty spaces around the starting point of the pipeline 1. Furthermore, the installation of the pipeline 1 may be programmed without constraints if other structures are installed near the starting point of the pipeline 1.

The damping by means of buoys 14, 15 displays a more rapid damping response and does not require any movement coordination between two vessels on the surface.

The system and method according to the invention does not require the installation and subsequent removal of a temporary anchor, in addition to the foundation of the fixed receiving structure 4.

The laying method and system can be used in versatile manner with a wide range of pipelines and risers for deep and ultra-deep waters and in a wide range of weather conditions and marine currents. The laying method and system does not require further service vessel, in addition to the laying vessel.

The method and system according to the invention allow a lighter sizing of the fixed receiving structure 4 and of the pipeline end termination device 9 because it is subject to smaller dynamic stresses. Furthermore, if the pipeline end termination device 9 is abutted and coupled directly to the fixed receiving structure 4, the pipeline end termination device 9 itself may be made as a light structure and does not require a mud mat, i.e. an extended anti-sinking structure which distributes the loads to prevent embedding in the mud of the seabed.

In addition, if the pipeline end termination device is abutted and coupled directly to the fixed receiving structure 4, the pipeline end termination device 9 itself can be configured for direct anchoring to the fixed receiving structure 4, whereby eliminating the use of permanent anchoring chains.

The method and the system according to the present invention can be used to produce the initial end of offshore pipelines extended on the seabed or steel catenary risers (SCR) or steel lazy wave risers (SLWR).

According to an embodiment, the method comprises a step of temporary fixing the damping buoy 14 to the fixed receiving structure 4, before the step of extending the first length 10 of the pipeline 1 toward the provisional anchoring position 11.

Figure 1A:
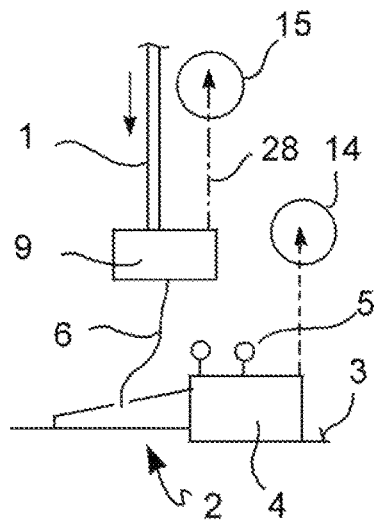
FIGS. 1A-1F are diagrammatic sketches which illustrate a system and the steps of a method for initiating the laying of a submarine pipeline.
Figure 1B:
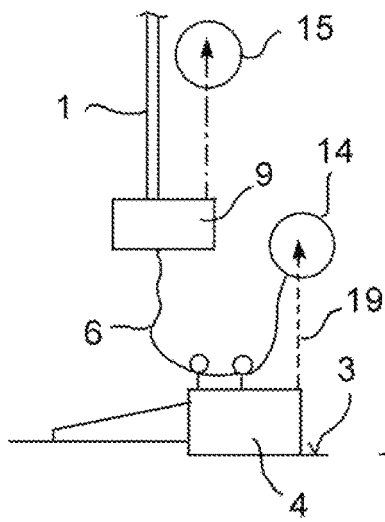
Figure 1C:
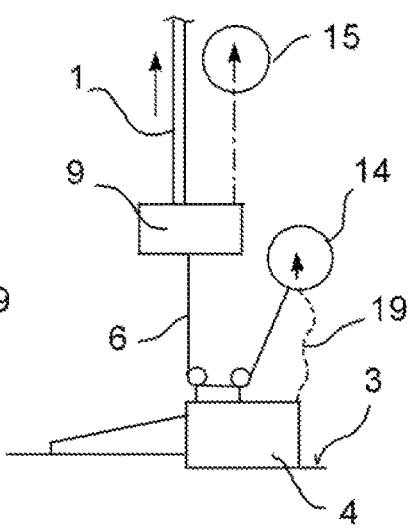

The provisional fixing takes place by means of a retaining cable 19 having two ends (provided of hook or eyelet), one of which is removably connectable to a provisional hooking ring 20 of the fixed receiving structure 4 and the other to a hooking ring of the damping buoy 14. The retaining cable 19 is considerably shorter than the damping cable 6 and retains the damping buoy 14 in a ready position at a distance vertically over the fixed receiving structure 4 (FIGS. 1A, 2B, 3A).

According to an embodiment, the method comprises a step of positioning and fixing of an auxiliary cable 21 onto the fixed receiving structure 4 (to be used as messenger), in which the auxiliary cable 21 extends through the redirecting device 5 and forms two opposite ends extending outside the redirecting device 5. A first end of the auxiliary cable 21 (possibly in the form of a loop, ring or hook) is connectable, e.g. by means of a hook, to a free end 22 (possibly in the form of a loop, ring or hook) of the damping cable 6 opposite to its end connected with the pipeline end termination device 9. A second end of the auxiliary cable 21 (possibly in the form of a loop, ring or hook) is configured to be gripped by a gripping member 24 of a remotely operated vehicle (ROV) 23 and pulled to pull the free end 22 of the damping cable 6 through the redirecting device 5 (FIGS. 2C, 3B, 3C).

According to an embodiment, the step of paying-out of the first length 10 of the pipeline 1 from the laying vessel 7 comprises lowering the pipeline end termination device 9 until reaching the provisional anchoring position 11 at a determined vertical safety distance 12, preferably 80-110 m and more preferably 95-100 m, from the seabed 3 (FIG. 2B).

The assembly and the laying of the pipeline 1 preferably takes place by "J" laying by means of a "J" laying tower 29 installed on the laying vessel 7 (FIG. 2A).

Figure 1D:
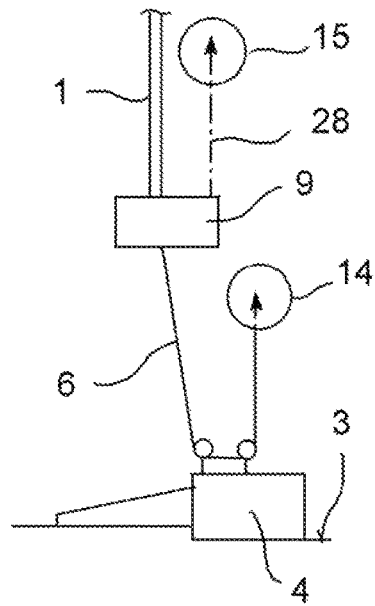
Figure 1E:
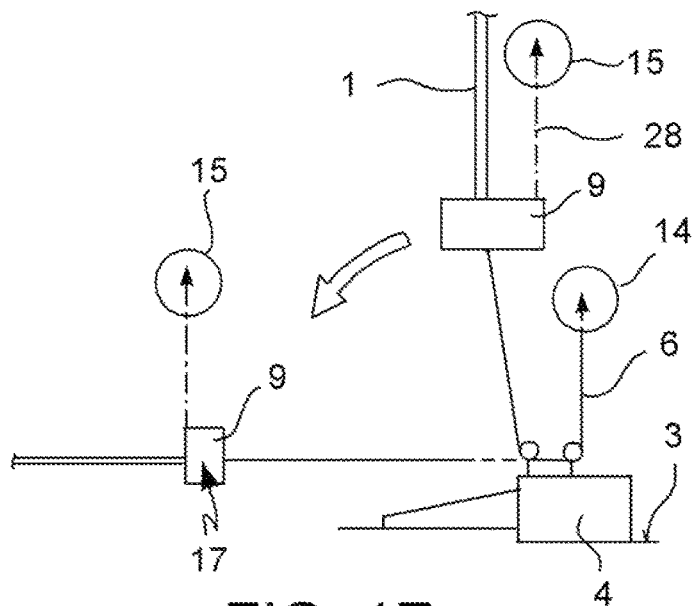
Figure 1F:
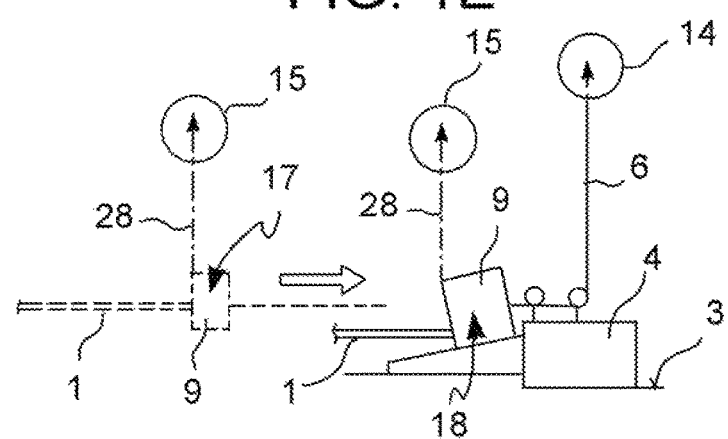
Figures 4A, 4B:
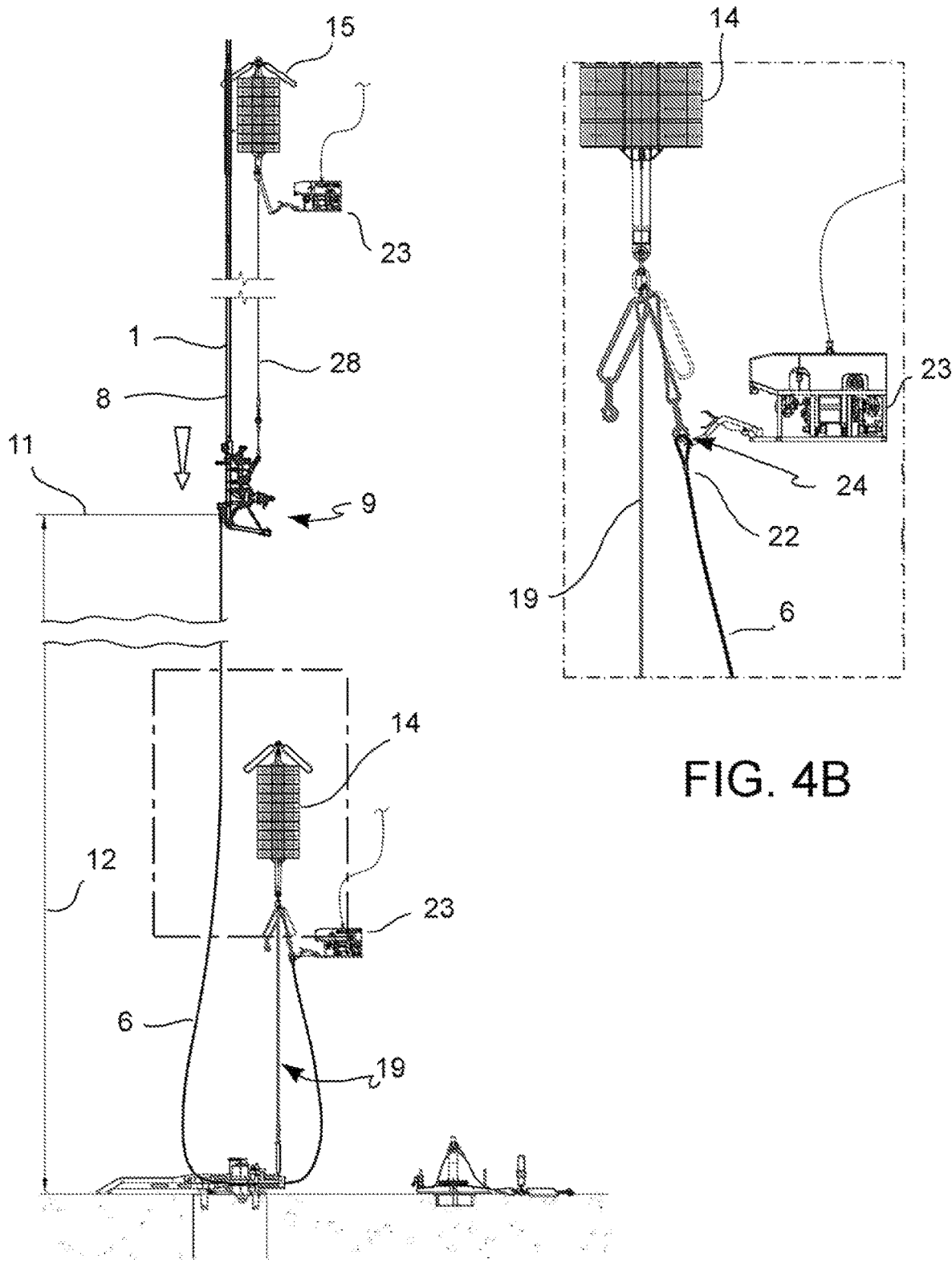

According to an embodiment, the suspension buoy 15 can be connected to the pipeline end termination device 9 either before or after the arrival of the pipeline 1 in the provisional anchoring position 11, preferably by means of a (steel) suspension cable 28 having two ends (provided with a hook, ring or eyelet) removably connectable one to a hooking ring of the pipeline end termination device 9 and the other to a hooking ring of the suspension buoy 15. The suspension cable 28 is shorter than the first length 10 of the pipeline 1 and retains the suspension buoy 15 in a position at a distance vertically above the pipeline end termination device 9 (FIGS. 1D, 7A). The suspension cable 28 can be connected to the pipeline end termination device 9 underwater by the remotely operated vehicle (ROV) 23 or aboard the laying vessel 7.

According to an embodiment (FIGS. 2C, 3B, 3C), the step of extending the damping cable 6 by the pipeline end termination device 9 through the redirecting device 5 until the damping buoy 14 comprises the steps of:
  releasing a fixing (e.g. one or more fixing slings) between the auxiliary cable 21 and the fixed receiving structure 4,
  connecting the first end of the auxiliary cable 21 to the free end 22 of the damping cable 6 (FIG. 2C),
  gripping the second end of the auxiliary cable 21 and pulling it to pull the free end 22 of the damping cable 6 through the redirecting device 5 (FIG. 3B),
  gripping the free end 22 of the damping cable 6 and connecting it to the (hooking ring of) the damping buoy 14 held by the retaining cable 19 in ready position (FIGS. 4A, 4B), performing these steps preferably by means of the gripping member 24 of the remotely operated vehicle (ROV) 23.

If necessary, at this stage, it is possible to pay out the pipeline 1 from the laying vessel 7 further downwards to allow the passage of a sufficient length of damping cable 6 through the redirecting device 5.

Before connecting the damping cable 6 to the damping buoy 14 it is advantageous to detach the auxiliary cable 21 from the damping cable 6, to avoid twisting.

Alternatively, the damping cable 6 itself can be pre-installed on the fixed receiving structure 4 and extended through the redirecting device 5 before the extension of the pipeline 1 in the provisional anchoring position 11 or before installing the fixed receiving structure 4 on the seabed 3.

In this case, an end of the damping cable 6 is gripped and connected with the pipeline end termination device 9 in the provisional anchoring position 11 and the other end of the damping cable 6 is already ready to be gripped and connected to the damping buoy 14 held by the retaining cable 19 in ready position.

Figure 5B:
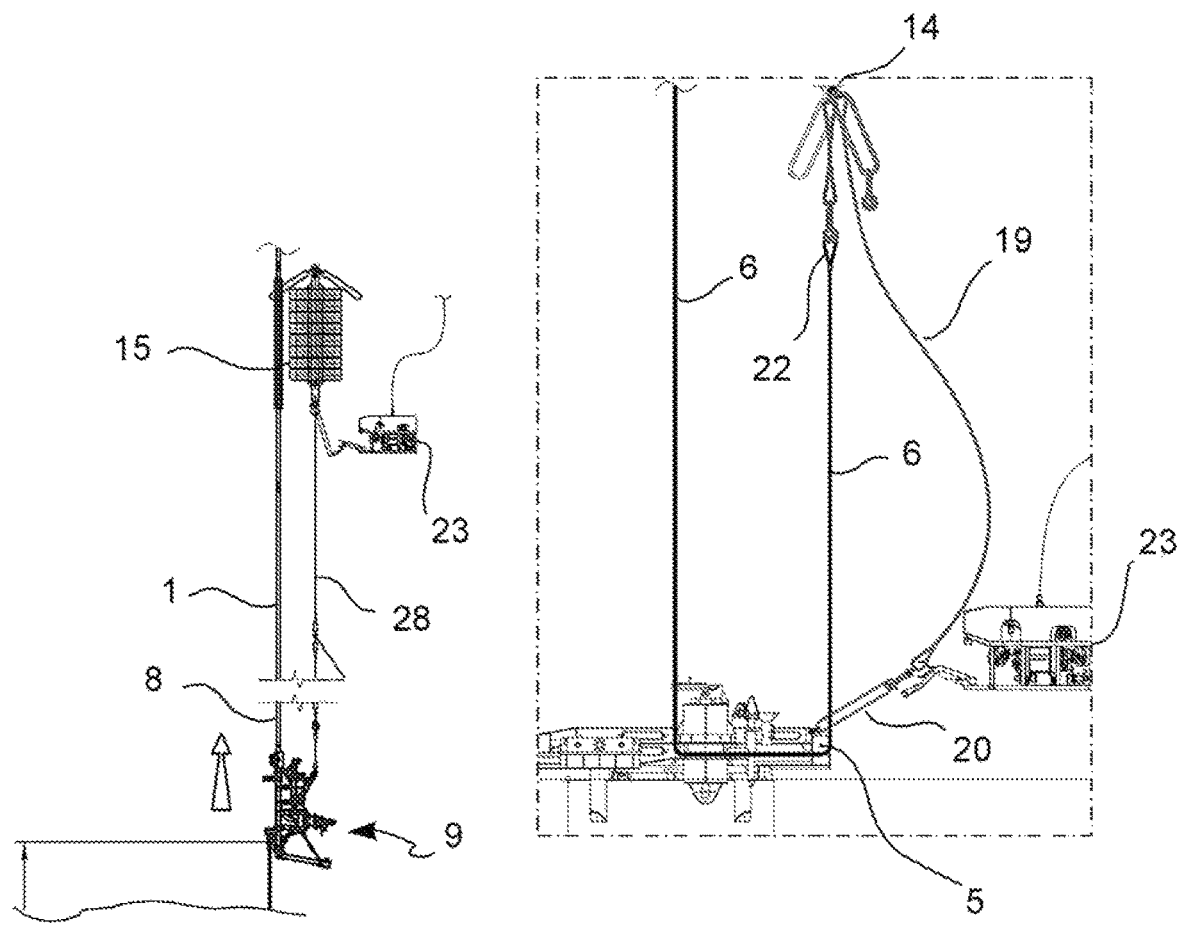
Figure 5A:
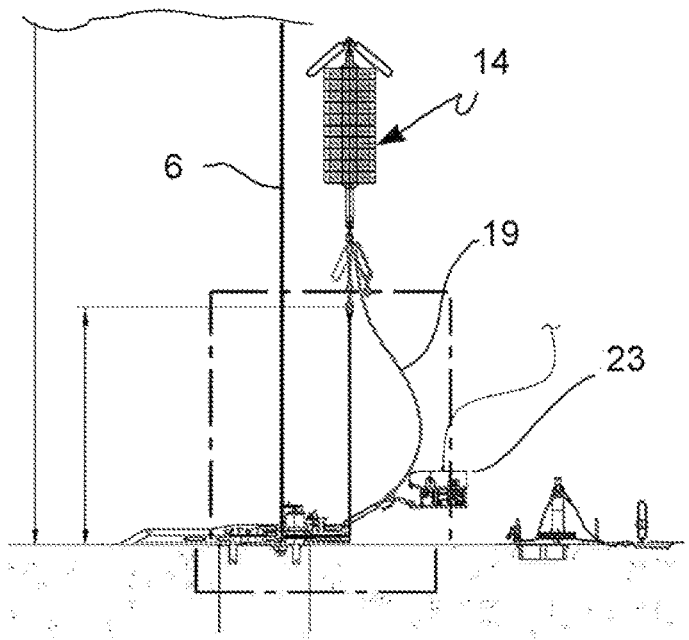
Figures 7C, 7D:
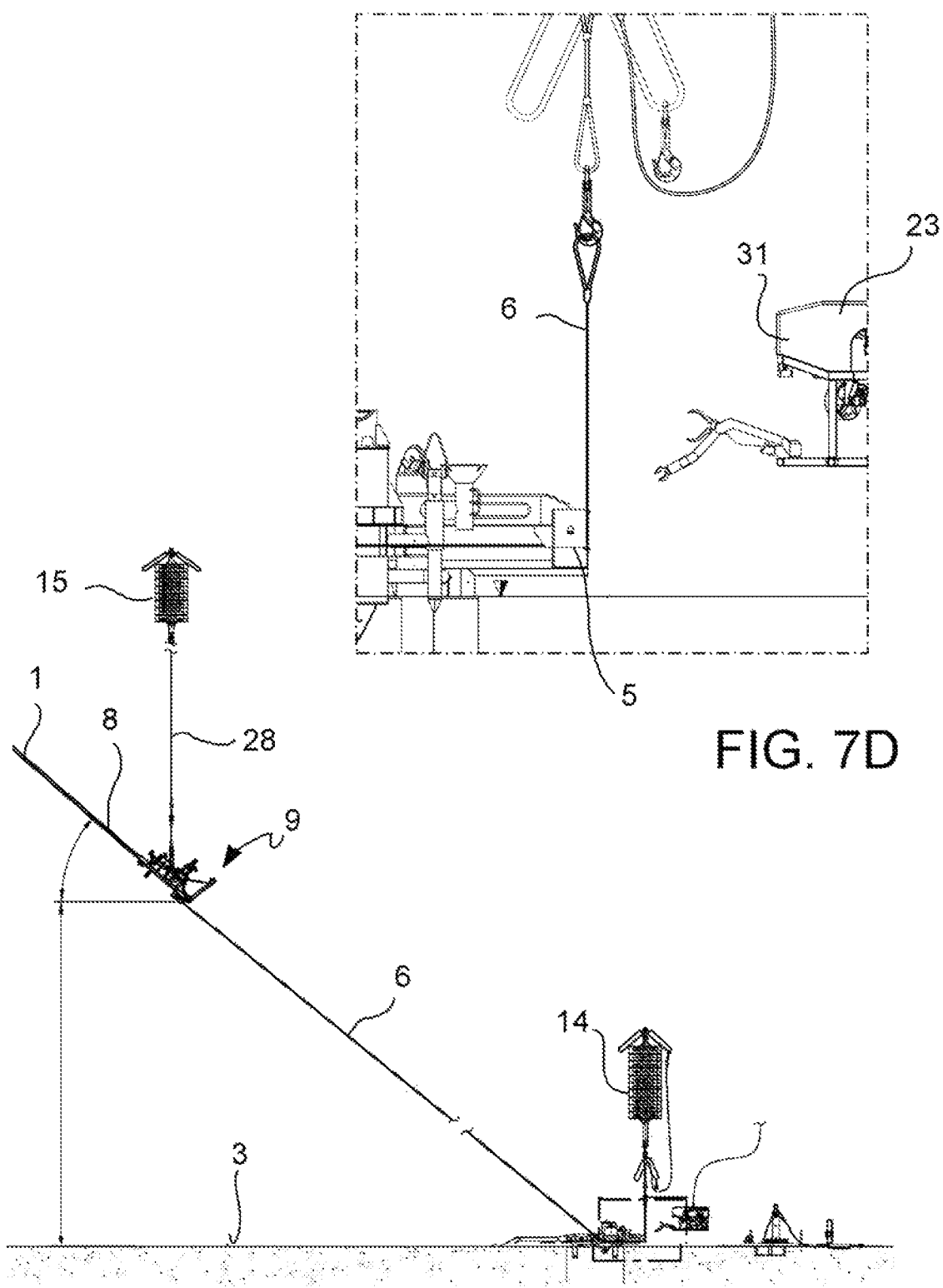
FIG. 7D shows an enlarged detail of FIG. 7C, FIGS. 8A and 8B illustrate the laying system and a step of horizontal positioning of the initial end length portion of the pipeline from a lowered position to a final abutting position.
Figure 7E:
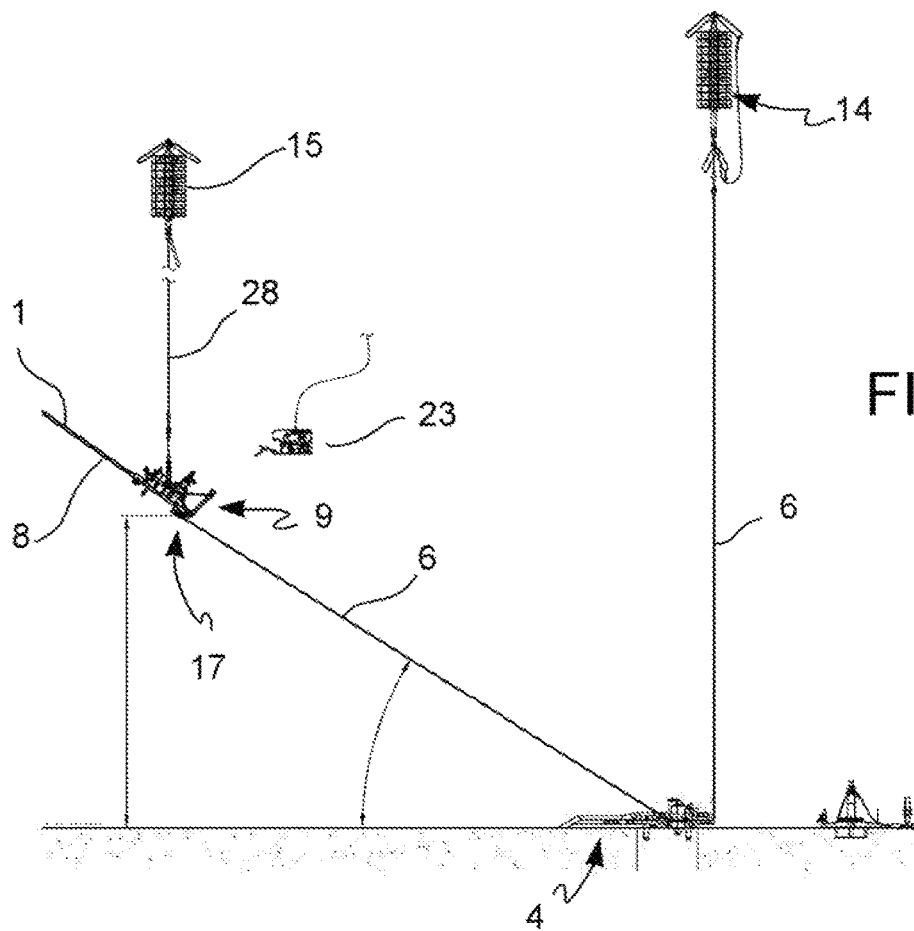

In order to be able to apply the buoyant force of the damping buoy 14 to the damping cable 6 it is necessary to loosen the retaining cable 19 and to tension the damping cable 6. This is done by retracting (lifting) the pipeline 1 for a given length, e.g. 10-20 m in the laying vessel 7 and/or moving away the laying vessel 7 from the target position 2, e.g. for a distance of e.g. 15 m-40 m (FIG. 5A).

With the retaining cable 19 loose, it is detached from the (provisional fastening ring 20 of the) fixed receiving structure 4 and hung in the compacted form to the damping buoy 14 (FIGS. 5B, 6A, 6B) or vice versa. This operation is also preferably performed by the remotely operated underwater vehicle (ROV) 23.

In the situation shown in FIGS. 1D and 6A, the pipeline 1 is still in the provisional anchoring position with the pipeline 1 positioned approximately vertical (or only slightly inclined) over the fixed receiving structure 4 and the target position 2, but in which:
  the pipeline end termination device 9 is yieldingly retained to the fixed receiving structure 4 by virtue of the damping cable 6,
  the direct suspension force of the suspension buoy 15 and the buoyant force redirected by the damping buoy 14 act on the pipeline end termination device 9.

According to an embodiment, the subsequent step of inclination of the initial end length 8 from the vertical orientation towards a horizontal or nearly horizontal orientation to the lowered position 17 (FIGS. 1E, 1F, 7A-7E, 8A) is performed by assembling and paying-out a further length 16 of the pipeline 1 from the laying vessel 7 and, either at the same time or in alternating steps, by moving the laying vessel 7 away from the target position 2 in a predetermined direction of initial extension of the pipeline and, possibly, by adjusting an inclination angle (inclination angle of the "J" laying tower 29) between the pipeline 1 released from the vessel 7 and the vessel 7.

Predetermined coordination tables, calculated as a function of sea depth and of the length and catenary configuration of the pipeline 1, can be used to coordinate the timing and the assembly and releasing speed of the pipeline 1 with the timing and movement speed of the laying vessel 7 and with the timing and width of the inclination angle between the pipeline 1 released from the vessel 7 and the vessel 7, In the lowered position 17, the pipeline end termination device 9 may have, for example, an inclination of about 20° with respect to the horizontal and a distance of about 20 m from the fixed receiving structure 4.

According to an embodiment, during the step of inclining the initial end length portion 8, the load values on the devices of the laying tower of the vessel 7 and/or the movements and/or the position of the damping cable 6 are monitored, preferably by optical detection means (e.g. one or more cameras 31) aboard a ROV 23 or aboard the fixed receiving structure 4, adjusting the position and/or the speed of the laying vessel 7 and/or the feeding speed of the pipeline 1, also according to the movements and/or the position of the damping cable 6.

This contributes to avoiding undesired collisions between the pipeline end termination device 9 and the damping buoy 14 in a step of initial approaching as well as between the pipeline end termination device 9 and the fixed receiving structure 4 during the step of landing.

When the initial end length 8 of the pipeline 1 approaches the lowered position 17 or is parked in the lowered position 17 (FIGS. 7E, 8A), it is advantageous to monitor the position of the damping cable 6 tensioned between the fixed receiving structure 4 and the pipeline end termination device 9 with respect to a target orientation marking 30 formed on the fixed receiving structure 4.

This monitoring can be performed by optical detection means (e.g. one or more cameras 31) aboard a ROV 23 or aboard the fixed receiving structure 4.

In case of misplacement of the damping cable 6 with respect to the target orientation marking 30 (during the step of approaching), the position can be corrected by adjusting the position of the laying vessel 7.

After having reached the lowered position 17 and the correct orientation of the initial end length portion 8 of the pipeline 1 with respect to target orientation marking 30, the pipeline end termination device 9 as well as the initial end length portion 8 of the pipeline 1 are still spaced from the seabed 3, or in other words, are not abutting on the seabed 3, also by virtue of the suspension force of the suspension buoy 15.

The successive step of abutting and anchoring of the pipeline end termination device 9 in the final abutting position 18 may comprise an abutment and anchoring of the pipeline end termination device 9 at a distance from the fixed receiving structure 4, e.g. directly on the seabed 3 or on a pre-installed anchoring foundation.

For this purpose, it may be necessary to reduce the buoyancy forces of the damping buoy 14 and of the suspension buoy 15, e.g. by weighting them by means of ballast masses or by tensioning them downwards. Successively, the damping buoy 14 and the suspension buoy 15 can be uncoupled from the pipeline end termination device 9, e.g. by means of the ROV 23.

Figure 8B:
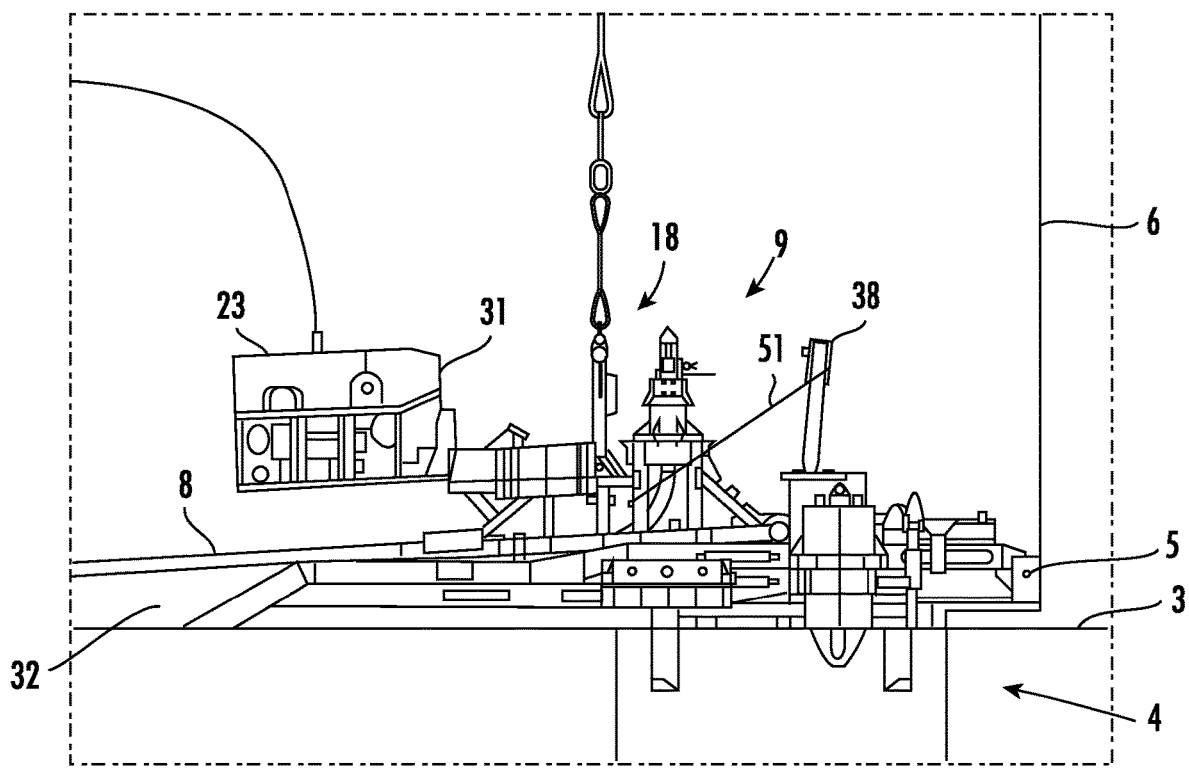
Figure 9:
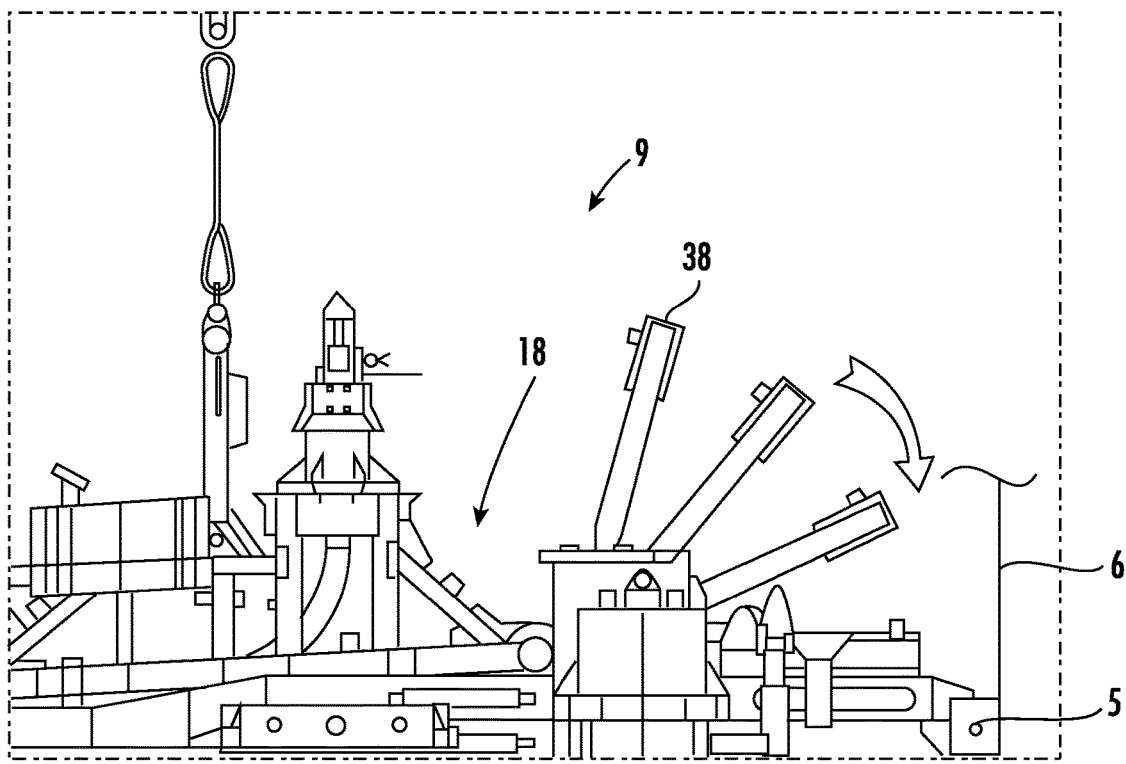
FIG. 9 illustrates the laying system and a step of coupling and anchoring of a pipeline end termination device of the initial end length portion of the pipeline to the fixed receiving structure.

According to an embodiment, the step of abutting the pipeline end termination device 9 in the final abutting position 18 comprises moving the laying vessel 7 and/or adjusting the inclination angle between the pipeline 1 released from the vessel 7 and the vessel 7 so as to approach the pipeline end termination device 9 towards the fixed receiving structure 4 up to abutting the pipeline end termination device 9 in the final abutting position 18 directly on the fixed receiving structure 4 (FIGS. 8A, 8B) and then stopping the pipeline end termination device 9 in the final abutting position 18, by positioning one or more stopping elements engaging with the pipeline end termination device 9 and the fixed receiving structure 4 (FIG. 9).

A successive, further feeding of the pipeline 1 together with a movement of the laying vessel 7 further lowers the initial end length 8 until it abuts on the seabed 3.

After the stopping or after an anchoring (which will be described below) of the pipeline end termination device 9 on the fixed receiving structure 4, it is possible to proceed with a step of continuous laying by the movement of the laying vessel 7 in the extension direction of the pipeline by means of the simultaneous assembly and feeding of the pipeline 1, e.g. by "J" laying.

Detailed Description of the Fixed Receiving Structure

Figure 14:
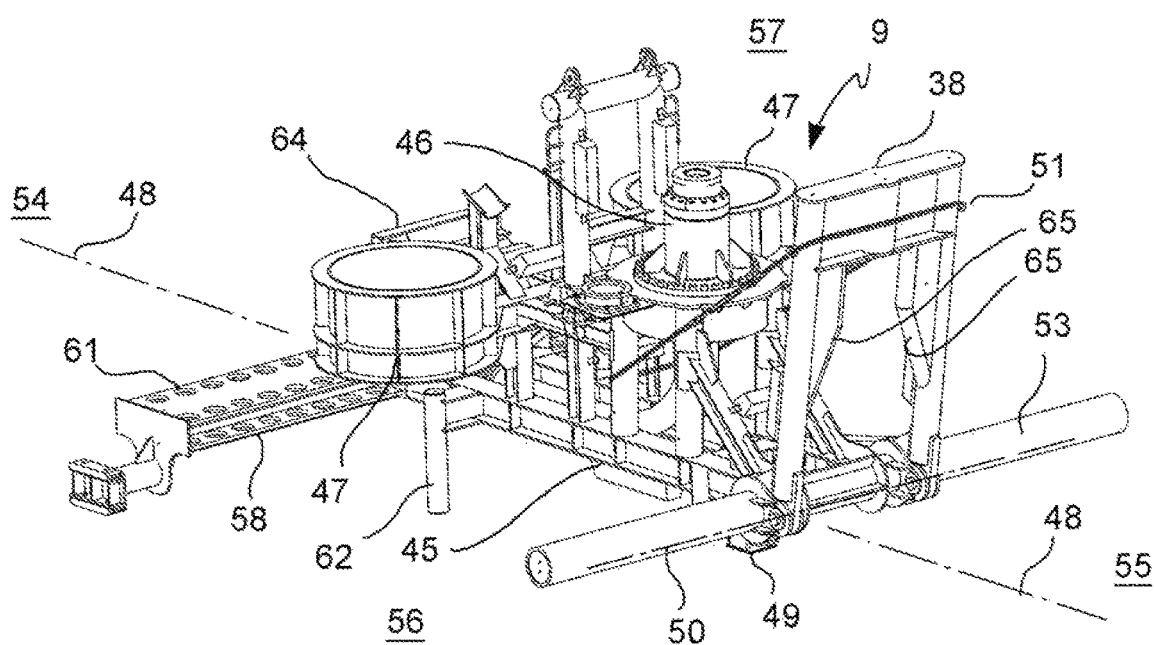
FIG. 14 is a perspective view of a pipeline end termination device, according to an embodiment.
Figure 18:
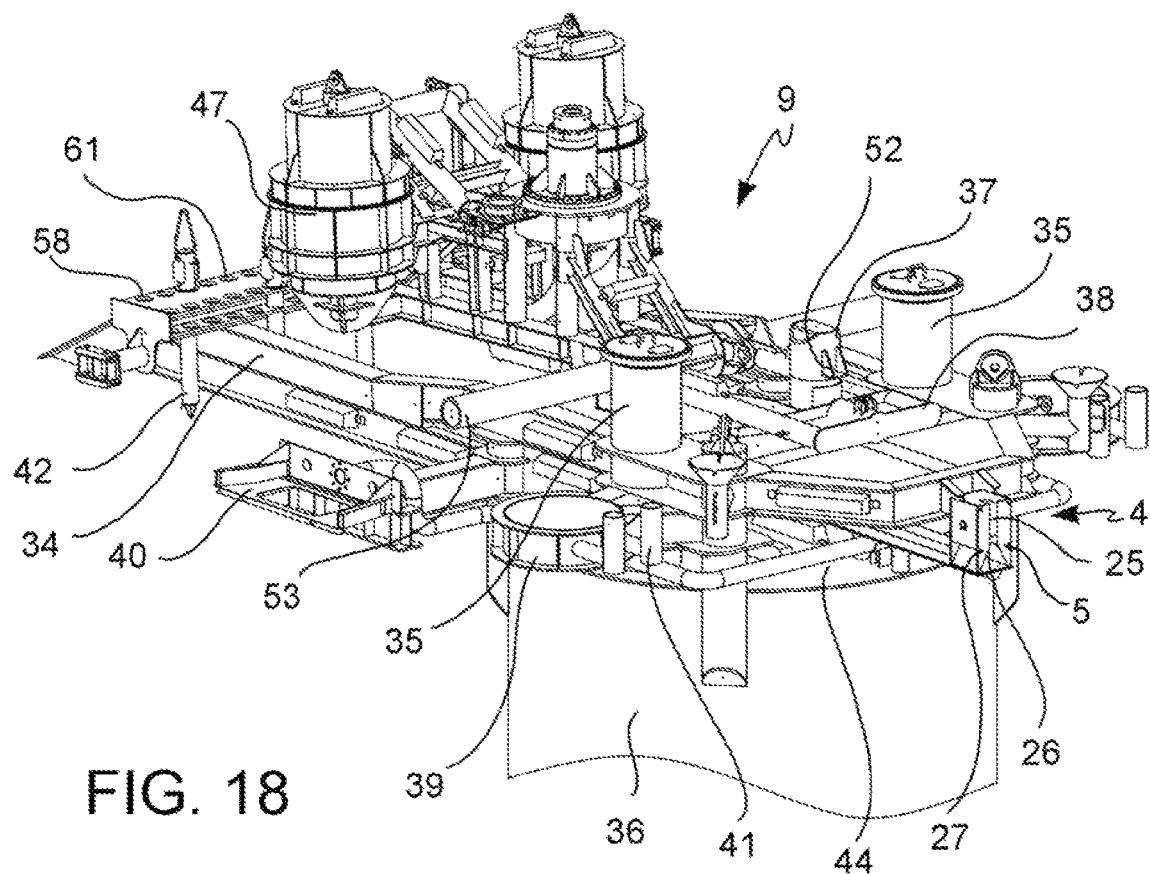
FIG. 18 is a perspective view of the pipeline end termination device with the locking yoke lowered into engagement with a locking pole of the fixed receiving structure.

According to an embodiment, the redirecting device 5 comprises one or more redirecting pulleys 25 or redirecting guides forming one or more supporting and redirecting surfaces 26 facing downwards, as well as one or more side guides 27 to prevent lateral exiting of the cable redirected by the redirecting surfaces 26 and/or to facilitate the insertion of the damping cable 6 into the groove of the redirecting pulley 25 during its tensioning (FIGS. 3C, 14, 18). A channel may be further provided between two rollerboxes of the redirecting device 5 for supporting the auxiliary cable 21.

Figure 13:
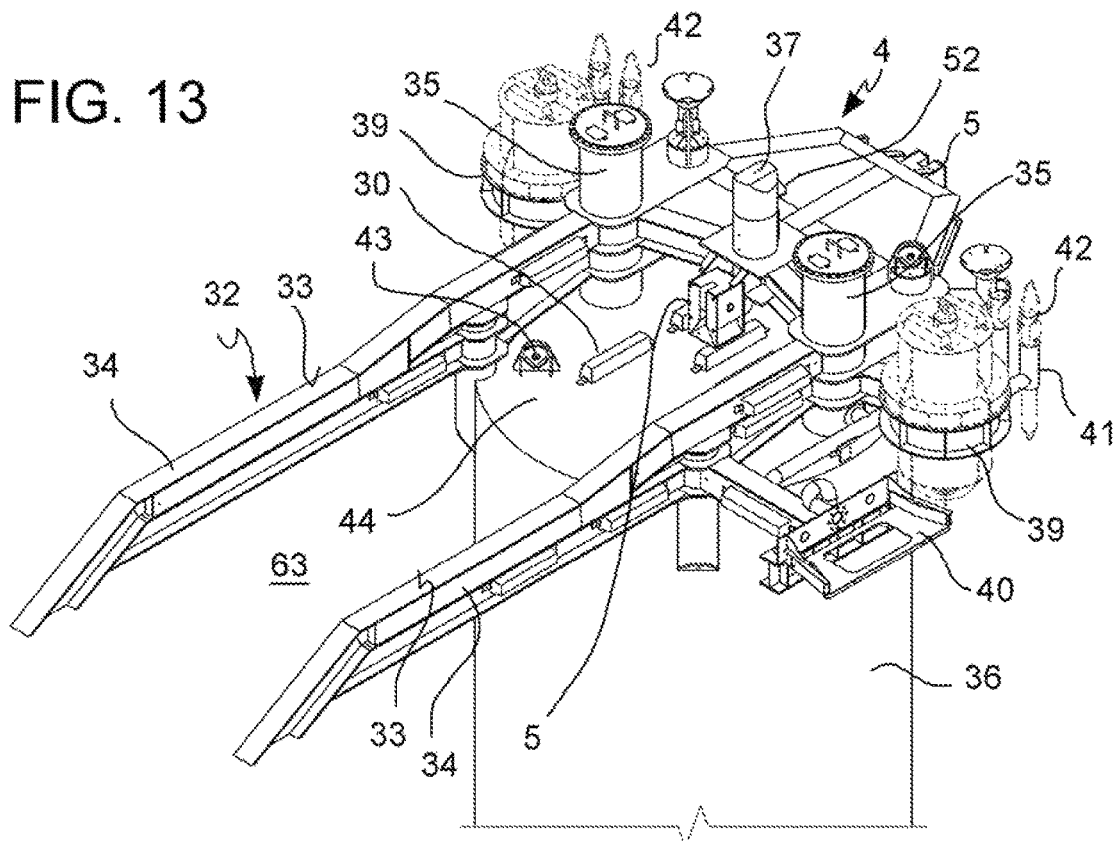
FIG. 13 is a perspective view of the fixed receiving structure, according to an embodiment.

According to an embodiment (FIG. 13), the fixed receiving structure 4 forms a landing ramp 32, with one or more guiding surfaces 33 forming a guide and an abutment from the bottom to the pipeline end termination device 9. The guiding surfaces 33 extend on two opposite sides with respect to the redirecting device 5 and in the same direction (preferably parallel to the target orientation provided for the pipeline end termination device 9), in such a way that the damping cable 6 redirected by the redirecting device 5 can feed the pipeline end termination device 9 along the guiding surfaces 33. Preferably, the landing ramp 32 comprises two steel beams transversally spaced apart and extending both approximately in the target orientation direction provided for the pipeline end termination device 9, wherein the guiding surfaces 33 are formed by upper flanges of the beams 34.

The fixed receiving structure 4 further forms one or more stop portions 35 which form a travel stop abutment against a further horizontal movement of the pipeline end termination device 9 along the guiding surfaces 33. The stop portions 35 may comprise two steel cylinders extending in vertical direction, and the stop portions 35 are arranged at ends of the guiding surfaces 33 (or of the beams 34) on two opposite sides with respect to the redirecting device 5.

Advantageously, the stop portions 35 can form or be formed by portions of vent hatch for a suction piles foundation 36 on which the fixed receiving structure 4 is installed.

In order to anchor the pipeline end termination device 9 permanently onto the fixed receiving structure 4, the fixed receiving structure 4 further comprises a locking pole 37 which can be engaged by shape connection by a corresponding locking yoke 38 of the pipeline end termination device 9. The anchoring is permanent because it is required and sized for the maximum residual pull on the pipeline end termination device 9 under the maximum environmental loads in service.

The locking pole 37 is preferably positioned at, e.g. over, the redirecting device 5, and protrudes upwards so that the locking yoke 38 can engage the locking pole 37 by means of a movement from the top downwards.

Figure 11:
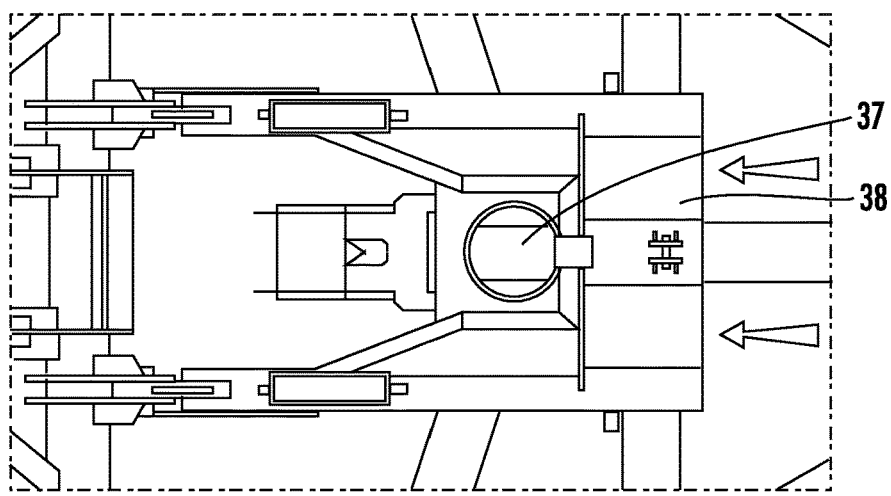
FIG. 11 is an enlarged view of a detail in FIG. 10.

According to an embodiment, the locking pole 37 forms a barb 52 to prevent an accidental lifting and undesired disengagement of the locking yoke 38, when the latter is pulled and positioned in abutment against a side surface of the locking pole 37 (FIGS. 11, 18). This is a precautionary measure during the step of installing with the laying vessel 7 subject to wave motion and in which the pipeline end termination device 9 is still lightened from the suspension buoy 15.

The fixed receiving structure 4 can also comprise a plurality of seats 41 to receive and keep ready locking pins 42 for a side locking of the pipeline end termination device 9 with respect to the fixed receiving structure 4. The locking pins may be necessary to withstand operating and service loads applied to the connector 46 of the pipeline end termination device 9.

The fixed receiving structure 4 may also comprise one or more, preferably two, ballast seats 39, formed for example on two opposite sides of the redirecting device 5 and, preferably, also on two opposite sides and externally with respect to the landing ramp 32, in order to receive ballast masses and keep them ready. It may be necessary to install such ballast masses on ballast seats 47 arranged on the device driven end 9 to weigh down and increase the stability of the pipeline end termination device 9 to withstand operating and service loads applied to the connector 46 of the pipeline end termination device 9.

The fixed receiving structure 4 can also comprise one or more ROV docking platforms 40 for a removable coupling and parking of the remotely operated vehicle 23. The ROV docking platform 40 is preferably positioned laterally on the outside and spaced from the landing ramp 32, in such a way as to avoid encroachments of space between a parked ROV 23 and the pipeline end termination device 9 coupled to the fixed receiving structure 4.

Finally, the fixed receiving structure 4 comprises one or more hooking seats 43 for transporting and lifting the fixed receiving structure 4 before it is installed on the seabed 3.

Preferably, the individual components of the fixed receiving structure 4 are mounted on a plate 44 which forms an upper plate of the foundation to the suction piles foundation 36.

Detailed Description of the Pipeline End Termination Device

According to an embodiment, the pipeline end termination device 9 comprises a supporting structure 45 having a rear side 54 connectable to the free end of the pipeline 1, a front side 55 opposite to the rear side 54, a bottom side 56 intended to be facing downwards, an upper side 57 opposite the lower side 56 and a longitudinal extension from the rear side 54 to the front side 55 along a longitudinal axis 48 aligned with the orientation of the end of the pipeline 1. The supporting structure 45 supports a connector 46 for the fluidic connection to the end of the pipeline 1 to an application, for example with a pipeline of a well head.

The pipeline end termination device 9 comprises one or two front sliding bars 53, connected to the supporting structure 45 near the rear side 55 for slidingly abutting from above on a landing ramp 32.

The front sliding bars 53 may comprise cylindrical tubular profiles extending in a transversal (horizontal) direction with respect to the longitudinal axis 48.

The pipeline end termination device 9 further comprises one or two rear resting profiles 58 connected to the supporting structure 45 near the rear side 54 for slidingly abutting on the landing ramp 32 from above.

The rear supporting profiles 58 may comprise plates extending in a transversal (horizontal) direction with respect to the longitudinal axis 48 and, possibly, parallel to the front sliding bars 53 (FIG. 14).

The front sliding bars 53 may comprise a mark 59 (e.g. a colored area) intended to be positioned at the guiding surfaces 33 (of the beams 34) and/or at a corresponding mark 60 (e.g. a colored area) of the stop portions 35 of the fixed receiving structure 4.

This facilitates checking the positioning of the pipeline end termination device 9, e.g. by means of a camera either aboard a ROV 23 or installed on the fixed receiving structure 4 or on the pipeline end termination device 9, e.g. during the step of initiating and landing.

The rear supporting profiles 58 form a hole array 61 for receiving locking pins 42 in selectable positions to provide a side engagement or locking against the landing ramp 32 in order to lock the pipeline end termination device 9 against unwanted and/or excessive lateral displacements (FIGS. 12, 18), e.g. caused in service of the field by operating loads applied on the connector 46 of the pipeline end termination device 9.

The locking pins 42 may be positioned by the ROV 23.

The pipeline end termination device 9 can further comprise one or two rough guiding portions 62 protruding from the supporting structure 45 downwards in a region which is intended to be placed at a free space 63 of the landing ramp 32, e.g. in the free space between the two beams 34. The rough guiding portions 62 may be formed by vertical bars or tubular sections and facilitate the initial insertion of the pipeline end termination device 9 on the landing ramp 32 in addition to preventing (by engaging from the inside against the beams 34) rough side misplacements of the pipeline end termination device 9.

The pipeline end termination device 9 further comprises the aforesaid locking yoke 38 arranged on the front side of the supporting structure 45 and connected to the supporting structure 45 in a rotatable manner about a (horizontal) tilting axis 50 transversal to the longitudinal axis 48.

The locking yoke 38 is rotatable or tiltable between a raised engagement position (FIGS. 8B, 14, 15, 17) and a lowered position of engagement with the locking pole 37 (FIGS. 9, 11, 18).

According to an embodiment, the locking yoke 38 is permanently biased towards the lowered engaging position, and releasable retaining means are provided to hold it in the raised disengaging position.

In an embodiment, in the raised disengagement position the locking yoke 38 extends with a forward inclination with respect to the tilting axis 50. In this way, the resultant of the gravitation force of the locking yoke 38 is orthogonally spaced from the tilt axis 50 and the locking yoke 38 is biased by its own weight towards the lowered position of engagement.

Either alternatively or additionally, elastic means and/or auxiliary traction means drive (not shown in the figures)

may be provided to bias the locking yoke 38 towards the lowered position of engagement.

Figure 15:
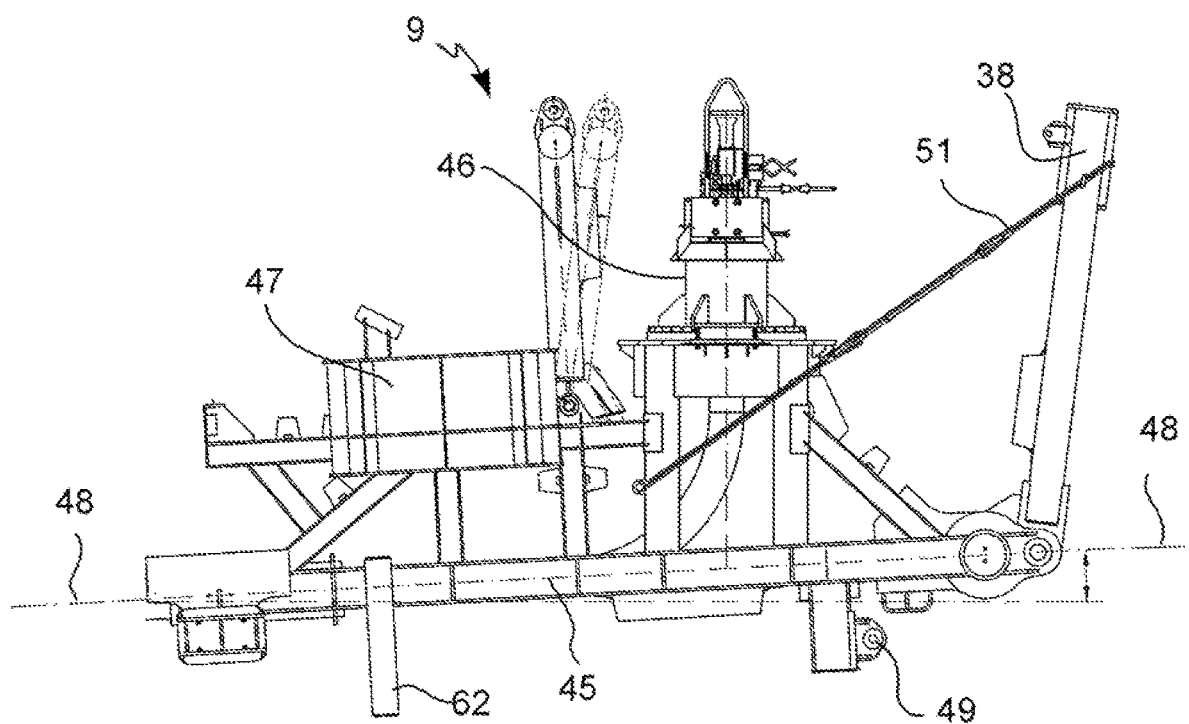
FIGS. 15 and 16 are views from the side and from above of the pipeline end termination device, according to an embodiment.
Figure 16:
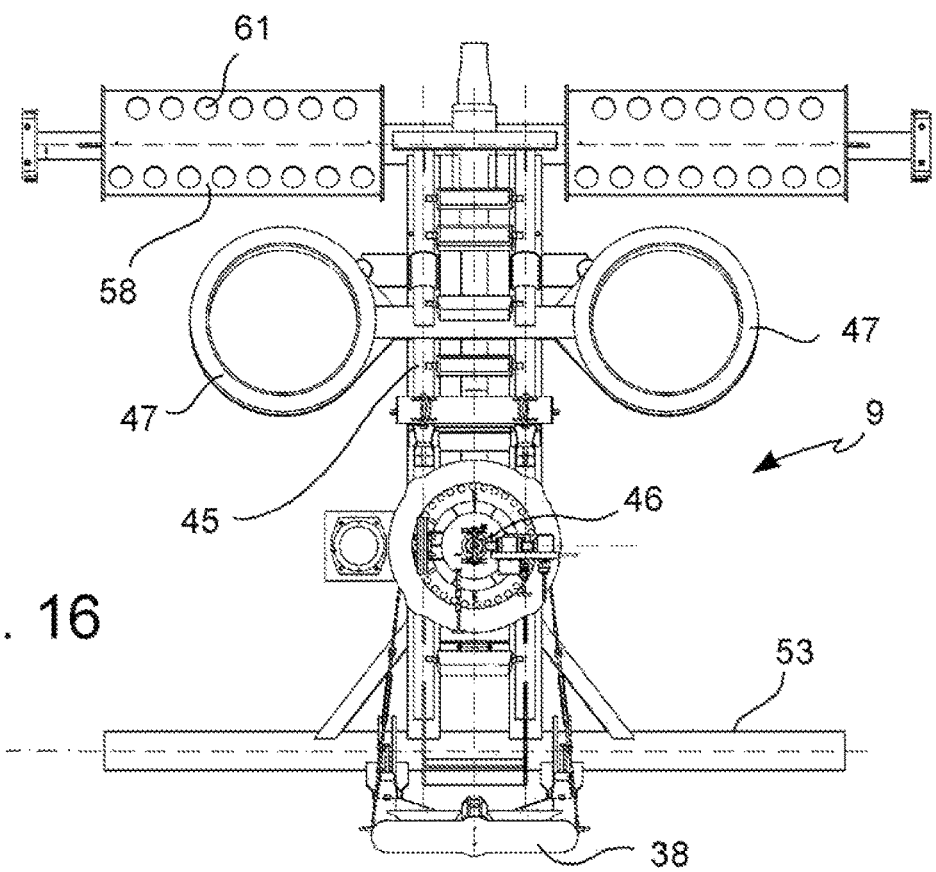

The releasable retainer means may comprise a retaining sling 51 which binds the locking yoke 38 to the supporting structure 45 and which can be released, e.g. cut by a cutting tool of an underwater remotely operated vehicle (ROV) 23 (FIGS. 14, 15).

According to an embodiment, the locking yoke 38 has the shape of a simple frame with two uprights and a crosspiece and can form two opposite guiding-in surfaces 65 converging to facilitate the engagement and the correct mutual positioning with the locking pole 37 (FIG. 11).

The pipeline end termination device 9 may comprise one or more, preferably two additional ballast seats 47 connected to the supporting structure 48 and positioned, for example, on its two opposite sides with respect to the longitudinal axis 48 and, preferably, also on two opposite sides and externally with respect to the locking yoke 38.

The pipeline end termination device 9 also comprises a connecting eyelet 49 for connecting an end of the damping cable 6. The connecting eyelet 49 is preferably positioned on the front side of the supporting structure 45 in a central position with respect to the longitudinal axis 48, so that the traction of the damping cable 6 aligns the longitudinal axis 48 of the pipeline end termination device 9 with the orientation of the damping cable 6.

The pipeline end termination device 9 can also comprise a docking bar 64 for docking an underwater remotely operated vehicle (ROV) 23 in such a position as to allow a visual monitoring, by means of the camera aboard the ROV 23, of the steps of approaching, supporting and/or locking of the pipeline end termination device 9 on the fixed receiving structure 4.

Figure 17:
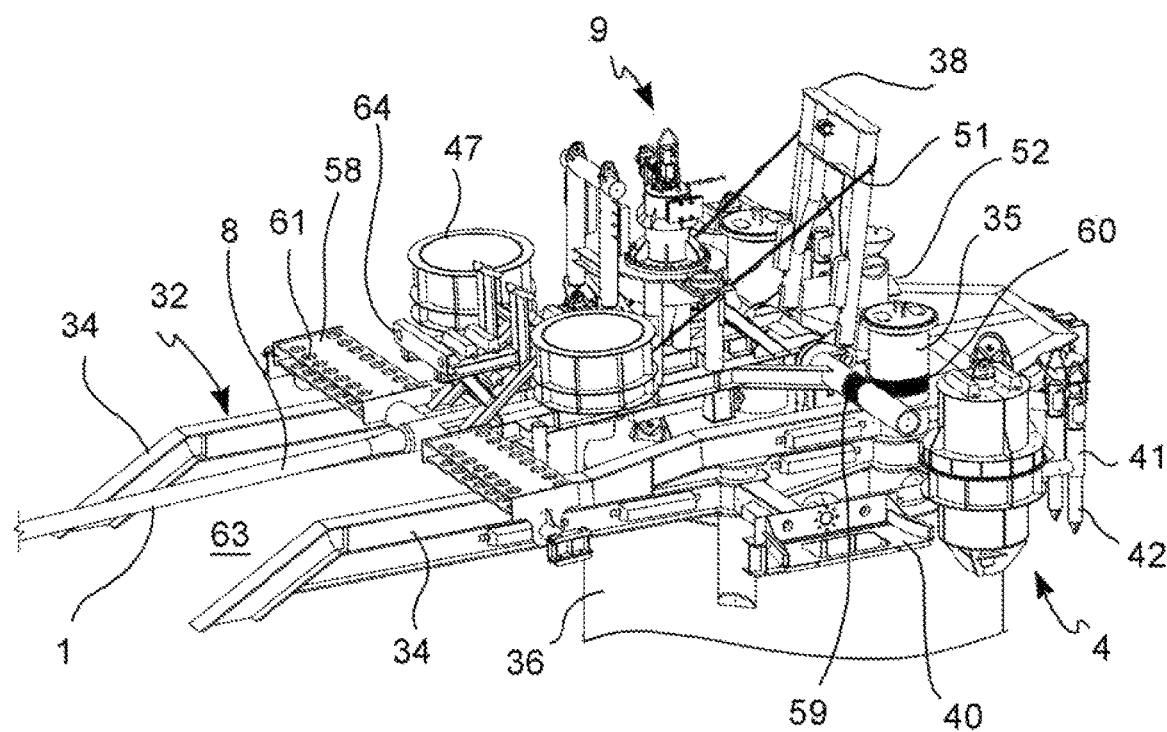
FIG. 17 is a perspective view of the pipeline end termination device abutting in a final abutting position on the fixed receiving structure, with a locking yoke raised.

Detailed Description of the Step of Abutting and Locking of the Pipeline End Termination Device on the Fixed Receiving Structure During the step of abutting of the pipeline end termination device 9, the damping cable 6 feeds the pipeline end termination device 9 towards the final abutting position (FIG. 8A), the front sliding bars 53 abut on the landing ramp 32 and slide along the landing ramp 32 until they abut against the stop portions 35. The correct positioning (step of approaching and for the purposes of a successive engagement by the locking yoke 38) can be checked (e.g. by means of a video camera installed on a ROV 23 docked to the pipeline end termination device 9) and adjusted by virtue of the marks 59 on the front sliding bars 53 and the corresponding marks 60 on the stop portions 35, the positions of which must correspond (FIGS. 8B, 17).

Successively, the locking yoke 38 is overturned into the engaging position with the locking pole 37, by releasing the retaining means, e.g. by shearing the retaining sling 51 by means of a ROV 23 (FIGS. 9, 18).

Figure 10:
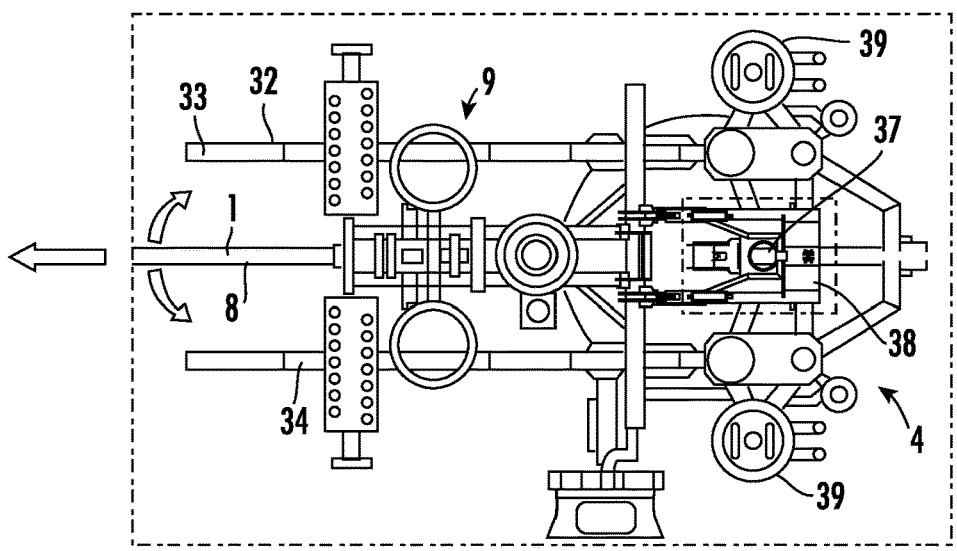
FIG. 10 illustrates the laying system and a step of adjusting position and orientation of a pipeline end termination device coupled to the fixed receiving structure.

Now the locking yoke 38 is fed into contact against the locking pole 37 (FIGS. 10 and 11). This is preferably achieved by moving away the laying vessel 7 and applying a traction force on the end of the pipeline 1 which is greater than the force of the damping buoy, or alternatively by separating the connection between the damping buoy 14 and the pipeline end termination device 9.

During this step, it is still possible to make a fine adjustment of the orientation on the horizontal plane of the pipeline end termination device 9 with respect to the fixed receiving structure 4, e.g. by means of a swinging adjustment movement of the laying vessel 7 (FIG. 10)

Figure 12:
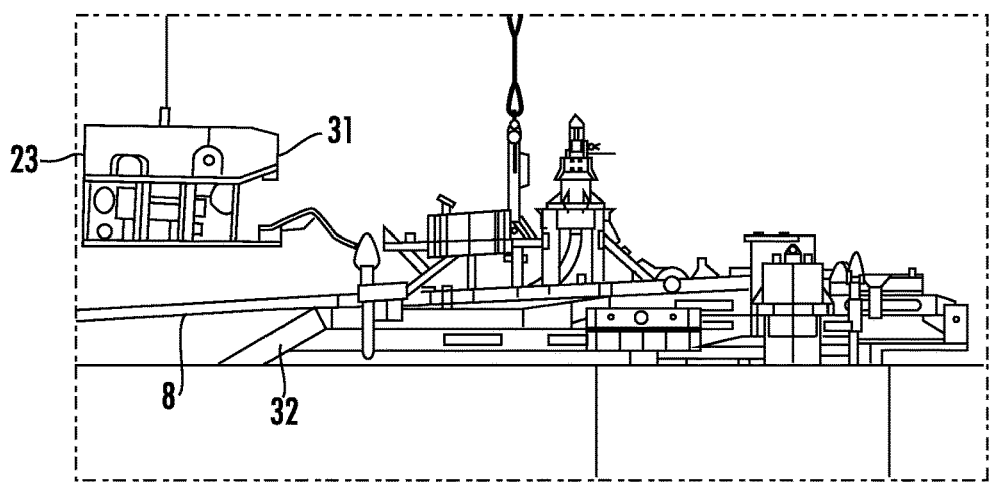
FIG. 12 shows a step of locking the position of the pipeline end termination device with respect to the fixed receiving structure by means of locking pins.

The locking of the orientation on the horizontal plane of the pipeline end termination device 9 with respect to the fixed receiving structure 4 can be achieved by taking the locking pins 42 from their seats 41 and inserting them in the selected holes of the holes 61 of the rear supporting profiles 58 so as to engage the lateral beams 34 of the landing ramp 32 and/or restrict future movements. The ROV 23 may also be used for this operation (FIGS. 12, 18).

The components described above are preferably made of steel or, alternatively of synthetic or composite material, possibly reinforced with fibers. The damping buoy 14 and suspension buoy 15 are underwater floats of construction known in itself (e.g. with syntactic foam modules, pressure chambers or ballastable, etc.).

Obviously, a person skilled in art, with the purpose of meeting specific and contingent needs, may make further changes and variants to the method and system according to the present invention, all of them without departing from the scope of protection of the invention, as defined in the following claims.

The invention claimed is:
1. A method of laying an off-shore pipe comprising:
installing in a target position on a seabed a fixed receiving structure having a redirecting device for a damping cable,
on a laying vessel, providing the pipe with an initial end length to which a pipeline end termination device is mounted,
connecting an underwater suspension buoy to the pipeline end termination device, the underwater suspension buoy applying to the pipeline end termination device a suspension force which is directed vertically upwards,
paying-out a first length of the pipe with the pipeline end termination device from the laying vessel vertically towards the seabed to a provisional anchoring position, in which the initial end length has an approximately vertical orientation with a vertical safety distance between the pipeline end termination device and the seabed,
extending the damping cable from the pipeline end termination device through the redirecting device to an underwater damping buoy, so that the damping cable, slidingly supported and redirected by the redirecting device and tensioned by a buoyancy force of the damping buoy, forms a damping provisional anchoring of the pipeline end termination device to the fixed receiving structure,
moving the laying vessel horizontally away from the fixed receiving structure and paying-out, from the laying vessel, a further length of the pipe so as to incline the initial end length progressively from the vertical orientation towards a horizontal orientation up to a lowered position,
with the initial end length in the lowered position, moving the laying vessel to position the initial end length in the horizontal direction in a final abutment position with respect to said target position, then abutting the pipeline end termination device in the final abutment position,
during the steps of inclining to the lowered position and of horizontally positioning the initial end length:
using the suspension force of the suspension buoy to counterbalance at least part of a weight of the pipeline end termination device,
using the buoyancy force of the damping buoy to counterbalance a pulling force of the initial end length of the pipe and to damp movements of the initial end length of the pipe, using a sliding support of the redirected damping cable to allow relative compensation movements between the pipeline end termination device and the fixed receiving structure the method further comprising the steps of:

A) before the step of paying-out the pipe towards the provisional anchoring position:

positioning and fixing an auxiliary cable to the fixed receiving structure, wherein the auxiliary cable extends through the redirecting device and forms two opposite ends extending outside the redirecting device, B) after the step of paying-out the pipe to the provisional anchoring position:

connecting a first end of the auxiliary cable to a free end of the damping cable extending from the pipeline end termination device, gripping a second end of the auxiliary cable and pulling it to pull the free end of the damping cable through the redirecting device, gripping the free end of the damping cable and connecting it to the damping buoy held by a retaining cable in the ready position.

2. A method according to claim 1, comprising a step of temporarily fixing the damping buoy to the fixed receiving structure, before the step of extending the pipe towards the temporary anchoring position, by the retaining cable which is shorter than the damping cable and retains the damping buoy in a ready position at a distance vertically above the fixed receiving structure.

3. A method according to claim 2, comprising the steps of:

before the step of paying-out the pipe towards the provisional anchoring position, pre-installing the damping cable to the fixed receiving structure with the damping cable extending through the redirecting device, after the step of paying-out the pipe to the provisional anchoring position, gripping an end of the damping cable and connecting it to the pipeline end termination device, and gripping another free end of the damping cable and connecting it to the damping buoy held by the retaining cable in the ready position.

4. A method according to claim 1, comprising the steps of:

loosening the retaining cable and tensioning the damping cable by lifting the pipe for a length back into the laying vessel or by moving the laying vessel away from the target position, with the retaining cable loosened, detaching the retaining cable from the fixed receiving structure or from the damping buoy.

5. A method according to claim 1, comprising, during the step of inclining the initial end length from the vertical orientation to the lowered position, a step of varying an inclination angle between the pipe exiting the laying vessel and the laying vessel.

6. A method according to claim 1, comprising, during the step of inclining the initial end length from the vertical orientation to the lowered position, the steps of:

monitoring a position of the damping cable via an optical detector, and adjusting a position of the laying vessel and a paying-out speed of the pipe also in dependency of the position of the damping cable.

7. A method according to claim 1, comprising the steps of:

when the initial end length of the pipe is in the lowered position, monitoring a position of the damping cable with respect to a target orientation marking formed on the fixed receiving structure, via an optical detector, and in case of misplacement of the damping cable with respect to the target orientation marking, correcting the position by adjusting a position of the laying vessel.

8. A method according to claim 1, wherein the step of abutting and anchoring the pipeline end termination device in the final abutting position comprises:

the laying vessel approaching the pipeline end termination device towards the fixed receiving structure until abutting the pipeline end termination device in the final abutting position directly on the fixed receiving structure, subsequently locking the pipeline end termination device in the final abutting position by positioning locking members in engagement with the pipeline end termination device and with the fixed receiving structure, subsequently moving the laying vessel and further lowering the initial end length until abutting the seabed.

9. A method according to claim 1 comprising, during the step of abutting the pipeline end termination device:

abutting and sliding front sliding bars of the pipeline end termination device on a landing ramp of the fixed receiving structure until abutting the front sliding bars against stop portions of the fixed receiving structure, checking positioning of the pipeline end termination device using marks applied on the front sliding bars and corresponding marks applied on the stop portions.

10. A method according to claim 9, comprising:

locking an orientation on a horizontal plane of the pipeline end termination device with respect to the fixed receiving structure by inserting locking pins into selected holes of a hole array of the pipeline end termination device so as to engage the landing ramp laterally.

11. A method according to claim 1, wherein the step of anchoring the pipeline end termination device in the final abutting position comprises:

overturning a locking yoke of the pipeline end termination device from a raised disengaged position to a lowered position of engagement with a stop pole of the fixed receiving structure, subsequently separating a connection between the damping buoy and the pipeline end termination device.

12. A system for laying an off-shore pipe, the system comprising:

a fixed receiving structure installed in a target position on a seabed, said fixed receiving structure having a redirecting device for a damping cable, a pipeline end termination device mounted to an initial end length of a pipe, an underwater suspension buoy which is removably connectable to the pipeline end termination device so as to apply a vertically upwards directed suspension force to the pipeline end termination device, an underwater damping buoy having a buoyancy force, wherein the damping cable is removably connectable to the damping buoy and to the pipeline end termination device and extends through the redirecting device, so that the damping cable is slidingly supported and redirected by the redirecting device and tensioned by the buoyancy force of the damping buoy, so as to form a damping provisional anchoring of the pipeline end termination device to the fixed receiving structure, wherein:

the suspension force of the suspension buoy counterbalances at least part of a weight of the pipeline end termination device, the buoyancy force of the damping buoy counterbalances a pulling force of the initial end length of the pipe, and a sliding support of the redirected damping cable allows relative compensation movements between the pipeline end termination device and the fixed receiving structure;

wherein the fixed receiving structure forms a landing ramp with guiding surfaces which form a guide and an abutment support from below for the pipeline end termination device, said guiding surfaces extending on two opposite sides with respect to the redirecting device and in the same direction so that the damping cable drags the pipeline end termination device along the guiding surfaces.

13. A system according to claim 12, wherein the redirecting device comprises one or more redirecting pulleys or redirecting guides forming one or more supporting and redirecting surfaces facing downwards, as well as one or more side guides to prevent lateral exiting of the cable redirected by the redirecting surfaces.

14. A system according to claim 12, wherein the landing ramp comprises two steel beams transversally spaced apart and extending both approximately in a target orientation direction provided for the pipeline end termination device, wherein the guiding surfaces are formed by upper flanges of the beams.

15. A system according to claim 12, wherein the fixed receiving structure further forms one or more stop portions which form a travel stop abutment against a further horizontal movement of the pipeline end termination device along the guiding surfaces.

16. A system according to claim 15, wherein the stop portions comprise two steel cylinders extending in vertical direction and arranged at ends of the guiding surfaces on two opposite sides with respect to the redirecting device.

17. A system according to claim 12, wherein the fixed receiving structure comprises a locking pole which can be engaged from above by a corresponding locking yoke of the pipeline end termination device.

18. A system according to claim 17, wherein the locking pole forms a barb to prevent the locking yoke from undesirably uncoupling.

19. A system according to claim 17, wherein the locking yoke is arranged on a front side of a supporting structure and connected to the supporting structure so as to be overturned between a raised disengaging position and a lowered position of engagement with the locking pole.

20. A system according to claim 19, wherein the locking yoke is permanently biased towards the lowered position of engagement, and a releasable retainer holds the locking yoke in the raised disengaging position.

21. A system according to claim 20, wherein the locking yoke is biased by its own weight towards the lowered position of engagement and the releasable retainer comprises a retaining sling which binds the locking yoke to the supporting structure.

22. A system according to claim 19, wherein the locking yoke forms two opposite and converging guiding-in surfaces to facilitate the engagement and the correct mutual positioning with the locking pole.

23. A system according to claim 12, wherein the fixed receiving structure comprises ballast seats formed on two opposite sides of the redirecting device and outside the landing ramp for an additional temporary ballasting of the fixed receiving structure.

24. A system according to claim 12, wherein the pipeline end termination device comprises:

a supporting structure having a rear side which can be connected to a free end of the pipe, a front side opposite to the rear side and a longitudinal axis aligned with the orientation of the free end of the pipe, a connector for fluidly connecting the free end of the pipe to an application, a front sliding bar, connected to the supporting structure near the front side for slidingly abutting from above on the landing ramp of the fixed receiving structure, a rear abutting profile, connected to the supporting structure near the rear side for abutting from above on the landing ramp.

25. A system according to claim 24, wherein the front sliding bar comprises a mark intended to be positioned at a corresponding mark of a stop portion of the fixed receiving structure.

26. A system according to claim 25, wherein the rear abutting profile forms a hole array to accommodate locking pins in selectable positions to provide a side engagement against the landing ramp.

27. A system according to claim 24, wherein the pipeline end termination device comprises one or more rough guiding portions protruding from the supporting structure downwards in a region intended to be positioned at a free space of the landing ramp.

28. A system according to claim 12, wherein the pipeline end termination device comprises further ballast seats.

29. A method of laying an off-shore pipe comprising:

installing in a target position on a seabed a fixed receiving structure having a redirecting device for a damping cable, on a laying vessel, providing the pipe with an initial end length to which a pipeline end termination device is mounted, connecting an underwater suspension buoy to the pipeline end termination device, the underwater suspension buoy applying to the pipeline end termination device a suspension force which is directed vertically upwards, paying-out a first length of the pipe with the pipeline end termination device from the laying vessel vertically towards the seabed to a provisional anchoring position, in which the initial end length has an approximately vertical orientation with a vertical safety distance between the pipeline end termination device and the seabed, extending the damping cable from the pipeline end termination device through the redirecting device to an underwater damping buoy, so that the damping cable, slidingly supported and redirected by the redirecting device and tensioned by a buoyancy force of the damping buoy, forms a damping provisional anchoring of the pipeline end termination device to the fixed receiving structure, moving the laying vessel horizontally away from the fixed receiving structure and paying-out, from the laying vessel, a further length of the pipe so as to incline the initial end length progressively from the vertical orientation towards a horizontal orientation up to a lowered position, with the initial end length in the lowered position, moving the laying vessel to position the initial end length in the horizontal direction in a final abutment position with respect to said target position, then abutting the pipeline end termination device in the final abutment position, during the steps of inclining to the lowered position and of horizontally positioning the initial end length:

using the suspension force of the suspension buoy to counterbalance at least part of a weight of the pipeline end termination device, using the buoyancy force of the damping buoy to counterbalance a pulling force of the initial end length of the pipe and to damp movements of the initial end length of the pipe, using a sliding support of the redirected damping cable to allow relative compensation movements between the pipeline end termination device and the fixed receiving structure;

the method further comprising, during the step of abutting the pipeline end termination device:

abutting and sliding front sliding bars of the pipeline end termination device on a landing ramp of the fixed receiving structure until abutting the front sliding bars against stop portions of the fixed receiving structure, checking positioning of the pipeline end termination device using marks applied on the front sliding bars and corresponding marks applied on the stop portions.

30. A method of laying an off-shore pipe comprising:

installing in a target position on a seabed a fixed receiving structure having a redirecting device for a damping cable, on a laying vessel, providing the pipe with an initial end length to which a pipeline end termination device is mounted, connecting an underwater suspension buoy to the pipeline end termination device, the underwater suspension buoy applying to the pipeline end termination device a suspension force which is directed vertically upwards, paying-out a first length of the pipe with the pipeline end termination device from the laying vessel vertically towards the seabed to a provisional anchoring position, in which the initial end length has an approximately vertical orientation with a vertical safety distance between the pipeline end termination device and the seabed, extending the damping cable from the pipeline end termination device through the redirecting device to an underwater damping buoy, so that the damping cable, slidingly supported and redirected by the redirecting device and tensioned by a buoyancy force of the damping buoy, forms a damping provisional anchoring of the pipeline end termination device to the fixed receiving structure, moving the laying vessel horizontally away from the fixed receiving structure and paying-out, from the laying vessel, a further length of the pipe so as to incline the initial end length progressively from the vertical orientation towards a horizontal orientation up to a lowered position, with the initial end length in the lowered position, moving the laying vessel to position the initial end length in the horizontal direction in a final abutment position with respect to said target position, then abutting the pipeline end termination device in the final abutment position, during the steps of inclining to the lowered position and of horizontally positioning the initial end length:

using the suspension force of the suspension buoy to counterbalance at least part of a weight of the pipeline end termination device, using the buoyancy force of the damping buoy to counterbalance a pulling force of the initial end length of the pipe and to damp movements of the initial end length of the pipe, using a sliding support of the redirected damping cable to allow relative compensation movements between the pipeline end termination device and the fixed receiving structure;

wherein the step of anchoring the pipeline end termination device in the final abutting position comprises:

overturning a locking yoke of the pipeline end termination device from a raised disengaged position to a lowered position of engagement with a stop pole of the fixed receiving structure, subsequently separating a connection between the damping buoy and the pipeline end termination device.

31. A system for laying an off-shore pipe, the system comprising:

a fixed receiving structure installed in a target position on a seabed, said fixed receiving structure having a redirecting device for a damping cable, a pipeline end termination device mounted to an initial end length of a pipe, an underwater suspension buoy which is removably connectable to the pipeline end termination device so as to apply a vertically upwards directed suspension force to the pipeline end termination device, an underwater damping buoy having a buoyancy force, wherein the damping cable is removably connectable to the damping buoy and to the pipeline end termination device and extends through the redirecting device, so that the damping cable is slidingly supported and redirected by the redirecting device and tensioned by the buoyancy force of the damping buoy, so as to form a damping provisional anchoring of the pipeline end termination device to the fixed receiving structure, wherein:

the suspension force of the suspension buoy counterbalances at least part of a weight of the pipeline end termination device, the buoyancy force of the damping buoy counterbalances a pulling force of the initial end length of the pipe, and a sliding support of the redirected damping cable allows relative compensation movements between the pipeline end termination device and the fixed receiving structure, wherein, stop portions can form or be formed by portions of a vent hatch for a suction piles foundation on which the fixed receiving structure is installed.

32. A system for laying an off-shore pipe, the system comprising:

a fixed receiving structure installed in a target position on a seabed, said fixed receiving structure having a redirecting device for a damping cable, a pipeline end termination device mounted to an initial end length of a pipe, an underwater suspension buoy which is removably connectable to the pipeline end termination device so as to apply a vertically upwards directed suspension force to the pipeline end termination device, an underwater damping buoy having a buoyancy force, wherein the damping cable is removably connectable to the damping buoy and to the pipeline end termination device and extends through the redirecting device, so that the damping cable is slidingly supported and redirected by the redirecting device and tensioned by the buoyancy force of the damping buoy, so as to form a damping provisional anchoring of the pipeline end termination device to the fixed receiving structure, wherein:
the suspension force of the suspension buoy counterbalances at least part of a weight of the pipeline end termination device,
the buoyancy force of the damping buoy counterbalances a pulling force of the initial end length of the pipe, and
a sliding support of the redirected damping cable allows relative compensation movements between the pipeline end termination device and the fixed receiving structure,
wherein the fixed receiving structure comprises a locking pole which can be engaged from above by a corresponding locking yoke of the pipeline end termination device.

* * * * *